(12) United States Patent
Compton et al.

(10) Patent No.: US 11,851,545 B2
(45) Date of Patent: Dec. 26, 2023

(54) LOW DENSITY SYNTACTIC FOAMS VIA MATERIAL EXTRUSION ADDITIVE MANUFACTURING

(71) Applicant: University of Tennessee Research Foundation, Knoxville, TN (US)

(72) Inventors: Brett Gibson Compton, Knoxville, TN (US); Samantha Maness, Knoxville, TN (US); Robert Pack, Knoxville, TN (US); Madeline Wimmer, Maryville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 387 days.

(21) Appl. No.: 16/995,333

(22) Filed: Aug. 17, 2020

(65) Prior Publication Data

US 2021/0047490 A1 Feb. 18, 2021

Related U.S. Application Data

(60) Provisional application No. 62/887,825, filed on Aug. 16, 2019.

(51) Int. Cl.
*C08J 9/28* (2006.01)
*C08K 7/28* (2006.01)
(Continued)

(52) U.S. Cl.
CPC .............. *C08J 9/28* (2013.01); *B29C 64/118* (2017.08); *B33Y 10/00* (2014.12); *B33Y 70/10* (2020.01); *B33Y 80/00* (2014.12); *C08K 3/346* (2013.01); *C08K 7/28* (2013.01); *B29K 2063/00* (2013.01); *B29K 2101/10* (2013.01); *B29K 2105/04* (2013.01); *B29K 2105/165* (2013.01); *C08J 2201/0502* (2013.01); *C08J 2363/00* (2013.01); *C08K 2201/011* (2013.01)

(58) Field of Classification Search
None
See application file for complete search history.

(56) References Cited

U.S. PATENT DOCUMENTS

| 6,630,221 B1 * | 10/2003 | Wong .......................... C08J 9/00 428/313.5 |
| 11,020,909 B2 | 6/2021 | Compton et al. |
| 2021/0268746 A1 | 9/2021 | Compton et al. |

OTHER PUBLICATIONS

Gladysz et al., "Three-phase syntactic foams: structure-property relationships." Journal of Materials Science, vol. 41(13), pp. 4085-4092 (2006).

(Continued)

*Primary Examiner* — Jeffrey D Washville
(74) *Attorney, Agent, or Firm* — Jenkins, Taylor & Hunt, P.A.

(57) ABSTRACT

An ink formulation for additive manufacturing of low density syntactic foams is described. The ink formulation can include a thermoset resin, a curing agent suitable for use with the thermoset resin, a plurality of hollow spheres, such as glass microballoons, one or more solvents, and one or more non-hollow, viscosity modifying filler. Also described are a method of preparing the ink formulation, a method of preparing three-dimensional objects comprising low density syntactic foams, and the three-dimensional objects prepared thereby.

15 Claims, 24 Drawing Sheets
(22 of 24 Drawing Sheet(s) Filed in Color)

(51) Int. Cl.
  *C08K 3/34* (2006.01)
  *B29C 64/118* (2017.01)
  *B33Y 10/00* (2015.01)
  *B33Y 80/00* (2015.01)
  *B33Y 70/10* (2020.01)
  *B29K 105/04* (2006.01)
  *B29K 101/10* (2006.01)
  *B29K 105/16* (2006.01)
  *B29K 63/00* (2006.01)

(56) References Cited

OTHER PUBLICATIONS

Gupta et al., "Tensile properties of glass microballoon-epoxy resin syntactic foams." Journal of Applied Polymer Science, vol. 102(2), pp. 1254-1261 (2006).
Gupta et al., "A Review of Thermal Conductivity of Polymer Matrix Syntactic Foams—Effect of Hollow Particle Wall Thickness and Volume Fraction." JOM, vol. 6(2), pp. 234-245 (2012).
Koopman et al., "Microstructural failure modes in three-phase glass syntactic foams." Journal of Materials Science, vol. 41, pp. 4009-4014 (2006).
Shabde et al., "Experimental determination of the thermal conductivity of three-phase syntactic foams." Journal of Materials Science, vol. 41, pp. 2061-4073 (2006).
Zhao et al., "Measurement Techniques for Thermal Conductivity and Interfacial Thermal Conductance of Bulk and Thin Film Materials." Journal of Electronic Packaging, 138(4), Article ID 040802 (2016).
Evonik Corporation Amicure © CG-1200G Curing Agent brochure (2017), 2 pages.

* cited by examiner

LOW DENSITY SYNTACTIC FOAMS VIA MATERIAL EXTRUSION ADDITIVE MANUFACTURING

RELATED APPLICATIONS

The presently disclosed subject matter claims the benefit of U.S. Provisional Patent Application Ser. No. 62/887,825, filed Aug. 16, 2019; the disclosure of which is incorporated herein by reference in its entirety.

GOVERNMENT INTEREST

This invention was made with government support under grant number DE-NA0002839 awarded by the Department of Energy. The government has certain rights in the invention.

TECHNICAL FIELD

The presently disclosed subject matter relates to inks for the additive manufacturing of low density syntactic foams. The inks can comprise thermoset resins, hollow microballoons, a solvent or solvent mixture, and a viscosity modifying non-hollow filler. The presently disclosed subject matter further relates to methods of preparing the inks, to preparing three-dimensional objects comprising low density syntactic foams using the inks, and to the three-dimensional syntactic foam objects prepared thereby.

ABBREVIATIONS

° C.=degrees Celsius
percentage
μm=microns (or micrometers)
3D=three-dimensional
cc=cubic centimeters
cm=centimeters
DDS=diaminodiphenylsulfone
DMA=dynamic mechanical analysis
DSC=differential scanning calorimetry
g=grams
GMB=glass microballoon
h=hour
MEK=methyl ethyl ketone
mg=milligrams
min=minutes
mm=micrometers
MPa=megapascals
Pa=pascals
psi=pounds per square inch
Tg=glass transition temperature
TGA=thermogravimetric analysis
W=Watts
W/mK=Watts per meter-Kelvin

BACKGROUND

Syntactic foams are composite materials in which hollow structures, such as hollow glass, metal, or polymer microspheres, are dispersed in a matrix, such as a polymeric matrix. Syntactic foams are useful as high-performance, low density/light-weight materials in a variety of applications, including, for example, in undersea/marine applications, such as in deep-sea floats and buoys for offshore oil exploration and production, in aerospace applications, such as for the construction of radomes, in automotive applications, and in various other packing and insulation applications. Traditionally, methods of making syntactic foam objects have been limited, as the hollow microspheres can be crushed if subjected to compression. Thus, many syntactic foam objects are prepared in situ in a mold.

Three-dimensional (3D) printing is a next-generation advanced/additive manufacturing tool that has the potential to revolutionize the manufacture of a wide range of objects. However, when 3D printing polymeric materials, the scope of attainable physical, thermal, and mechanical properties can be restricted by a limited library of 3D printable monomers, polymers, and resins.

Accordingly, there is an ongoing need for additional formulations and preparation methods for the manufacture of 3D objects. In particular, there is an ongoing need for methods and formulations for preparing syntactic foam objects via additive manufacturing techniques, such as those that can provide facile and reproducible printing, that provide precise control of an object's shape and/or that can provide syntactic foam objects with reduced density and high strength.

SUMMARY

This Summary lists several embodiments of the presently disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this Summary or not. To avoid excessive repetition, this Summary does not list or suggest all possible combinations of such features.

In some embodiments, the presently disclosed subject matter provides a method of preparing a three-dimensional syntactic foam object, the method comprising: (a) providing a curable composition comprising a thermosetting resin, a curing agent, a plurality of hollow spheres, a solvent, and a non-hollow filler; (b) depositing a first layer of the curable composition; (c) depositing one or more additional layers of the curable composition on the first layer sequentially, thereby forming a three-dimensional curable object; and (d) curing the three-dimensional curable object, thereby providing the three-dimensional syntactic foam object. In some embodiments, the method further comprises pre-curing the three-dimensional curable object prepared in step (c) prior to step (d), wherein the pre-curing comprises heating the three-dimensional curable object to a first temperature for a first period of time, wherein the first temperature is a temperature lower than a temperature used to cure the curable object. In some embodiments, the first temperature is about 50 degrees Celsius (° C.) to about 100° C. and the first period of time is about 4 hours to about 3 days. In some embodiments, the method further comprises: (e) pyrolyzing the three-dimensional syntactic foam object at a second temperature for a second period of time, wherein the second temperature is about 600° C. to about 1000° C.

In some embodiments, the curable composition comprises: (i) about 5 weight percent (wt %) to about 25 wt % of the thermoset resin; (ii) about 0.1 wt % to about 6 wt % of the curing agent; (iii) about 20 wt % to about 40 wt % of the hollow spheres; (iv) about 30 wt % to about 55 wt % of the solvent; and (v) about 0.1 wt % to about 25 wt % of the non-hollow filler. In some embodiments, the thermoset resin is an epoxy resin and the curing agent is an amine or a substituted guanidine. In some embodiments, the curing agent is diaminodiphenylsulfone (DDS) or dicyandiamide. In some embodiments, the plurality of hollow spheres comprise hollow glass microspheres. In some embodiments, the solvent comprises one or more of methyl ethyl ketone (MEK), acetone, and camphor. In some embodiments, the non-hollow filler is one or more of the group comprising nanoclay, fumed silica, graphene, carbon fibers, and carbon nitride nanoparticles.

In some embodiments, the three-dimensional syntactic foam object has a density of about 0.38 grams per cubic centimeter (g/cc) or less or of about 0.21 g/cc or less. In some embodiments, the depositing comprises extruding the curable composition from a syringe or other extruder.

In some embodiments, the presently disclosed subject matter provides a three-dimensional syntactic foam object prepared according to the method comprising: (a) providing a curable composition comprising a thermosetting resin, a curing agent, a plurality of hollow spheres, a solvent, and a non-hollow filler; (b) depositing a first layer of the curable composition; (c) depositing one or more additional layers of the curable composition on the first layer sequentially, thereby forming a three-dimensional curable object; and (d) curing the three-dimensional curable object, thereby providing the three-dimensional syntactic foam object. In some embodiments, the object has a height of about 2 millimeters or more. In some embodiments, the object has a density of less than about 0.21 grams per cubic centimeter (g/cc) and a compressive strength of at least about 1 megapascal (MPa).

In some embodiments, the presently disclosed subject matter provides an ink composition for direct-write additive manufacture of a syntactic foam object, the composition comprising: (i) about 5 weight percent (wt %) to about 25 wt % of a thermoset resin; (ii) about 0.1 wt % to about 6 wt % of a curing agent; (iii) about 20 wt % to about 40 wt % of hollow spheres; (iv) about 30 wt % to about 55 wt % of a solvent; and (v) about 0.1 wt % to about 25 wt % of a non-hollow filler. In some embodiments, the thermoset resin is an epoxy resin and the curing agent is an amine or a substituted guanidine. In some embodiments, the curing agent is diaminodiphenylsulfone (DDS) or dicyandiamide.

In some embodiments, the hollow spheres are hollow glass microspheres. In some embodiments, the solvent comprises one or more of methyl ethyl ketone (MEK), acetone, and camphor. In some embodiments, the non-hollow filler is one or more of the group comprising nanoclay, fumed silica, graphene, carbon fibers, and carbon nitride nanoparticles.

In some embodiments, the presently disclosed subject matter provides a method of preparing an ink composition for additive manufacturing of a three-dimensional syntactic foam object, the method comprising: (a) adding a thermoset resin and a curing agent to a solvent or solvent mixture, thereby providing a first mixture and mixing the first mixture until any solids are dissolved; (b) adding a plurality of hollow spheres to the first mixture, thereby providing a second mixture, and mixing the second mixture; and (c) adding at least one non-hollow filler to the second mixture, thereby providing a third mixture and mixing the third mixture, thereby preparing the ink composition. In some embodiments, the method further comprises loading the ink composition into a syringe or other extrusion device. In some embodiments, the mixing of step (a), (b), and/or (c) is performed in a planetary mixer.

It is an object of the presently disclosed subject matter to provide a method of preparing a three-dimensional (3D) syntactic foam object, the 3D objects prepared thereby, ink compositions for direct-write additive manufacturing of syntactic foam objects, and methods of preparing the ink compositions. An object of the presently disclosed subject matter having been stated hereinabove, and which is achieved in whole or in part by the presently disclosed subject matter, other objects will become evident as the description proceeds when taken in connection with the accompanying drawings and examples as best described herein below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 2:
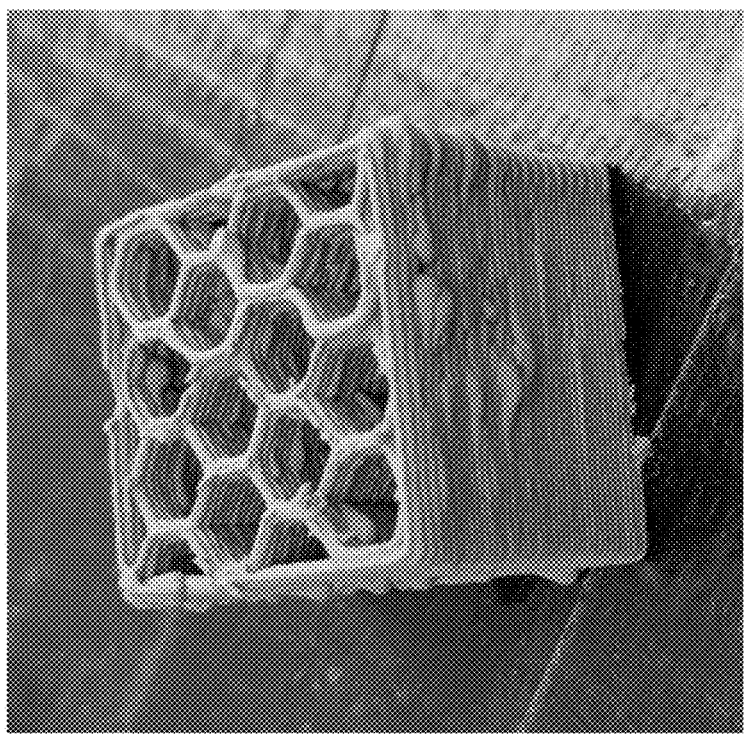
FIG. 2 is a photographic image of an exemplary three-dimensional (3D) honeycomb structure printed using an exemplary syntactic foam ink of the presently disclosed subject matter, i.e., Formula I, displaying bubbling.

The presently disclosed subject matter will now be described more fully hereinafter with reference to the accompanying Examples and Figures, in which representative embodiments are shown. The presently disclosed subject matter can, however, be embodied in different forms and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which this presently described subject matter belongs. All publications, patent applications, patents, and other references mentioned herein are incorporated by reference in their entirety.

Throughout the specification and claims, a given chemical formula or name shall encompass all optical and stereoisomers, as well as racemic mixtures where such isomers and mixtures exist.

I. Definitions

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims. Thus, for example, reference to "a solvent" includes a plurality or mixture of solvents, and so forth.

Unless otherwise indicated, all numbers expressing quantities of size, weight, percentage, temperature or other reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value or to an amount of size, weight, concentration, temperature, percentage, or the like is meant to encompass variations of, in some embodiments ±20%, in some embodiments ±10%, in some embodiments ±5%, in some embodiments ±1%, and in some embodiments ±0.1% from the specified amount, as such variations are appropriate to perform the disclosed methods.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The use of the term "or" in the claims is used to mean "and/or" unless explicitly indicated to refer to alternatives only or the alternatives are mutually exclusive, although the disclosure supports a definition that refers to only alternatives and "and/or." As used herein "another" can mean at least a second or more.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, a "monomer" refers to a molecule that can undergo polymerization, thereby contributing constitutional units, i.e., an atom or group of atoms, to the essential structure of a macromolecule.

As used herein, a "macromolecule" refers to a molecule of high relative molecular mass, the structure of which comprises the multiple repetition of units derived from molecules of low relative molecular mass, e.g., monomers and/or oligomers.

An "oligomer" refers to a molecule of intermediate relative molecular mass, the structure of which comprises a small plurality (e.g., 2, 3, 4, 5, 6, 7, 8, 9, or 10) of repetitive units derived from molecules of lower relative molecular mass.

A "polymer" refers to a substance comprising macromolecules. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units.

A "copolymer" refers to a polymer derived from more than one species of monomer.

A "block" refers to a portion of a macromolecule that has at least one feature that is not present in the adjacent portions of the macromolecule. A "block copolymer" refers to a copolymer in which adjacent blocks are constitutionally different, i.e., each of these blocks comprises constitutional units derived from different characteristic species of monomer or with different composition or sequence distribution of constitutional units.

For example, a diblock copolymer of polybutadiene and polystyrene is referred to as polybutadiene-block-polystyrene. Such a copolymer is referred to generically as an "AB block copolymer." Likewise, a triblock copolymer can be represented as "ABA." Other types of block polymers exist, such as multiblock copolymers of the $(AB)_n$ type, ABC block polymers comprising three different blocks, and star block polymers, which have a central point with three or more arms, each of which is in the form of a block copolymer, usually of the AB type.

A "branch point" (or "junction point") refers to a point on a chain (e.g., a main chain) at which a branch is attached. A "branch," also referred to as a "side chain," "graft," or "pendant chain," is an oligomeric or polymeric offshoot from a macromolecule chain. An oligomeric branch can be termed a "short chain branch," whereas a polymeric branch can be termed a "long chain branch."

A "chain" refers to the whole or part of a macromolecule, an oligomer, or a block comprising a linear or branched sequence of constitutional units between two boundary constitutional units, wherein the two boundary constitutional units can comprise an end group, a branch point, or combinations thereof.

A "main chain" or "backbone" refers to a linear chain from which all other chains are regarded as being pendant.

A "side chain" refers to a linear chain which is attached to a main chain at a branch point.

An "end group" (or "terminal group") refers to a constitutional unit that comprises the extremity of a macromolecule or oligomer and is attached to only one constitutional unit of a macromolecule or oligomer.

Polydispersity (PDI) or dispersity (Đ) refers to the ratio (Mw/Mn) of a polymer sample. Mw refers to the mass average molar mass (also commonly referred to as weight average molecular weight). Mn refers number average molar mass (also commonly referred to as number average molecular weight).

The terms "thermoset" and "thermosetting" can refer to a polymer that is irreversibly formed when polymer precursors (e.g., monomers and/or oligomers) react with one another when exposed to heat, suitable radiation (e.g., visible or ultraviolet light), and/or suitable chemical conditions (e.g., the addition of a chemical polymerization initiator or catalyst (e.g. a peroxide) and/or exposure to suitable pH conditions (such as brought about by the addition of an acid or base)). In contrast, a thermoplastic polymer is a polymer that softens and/or can be molded above a certain temperature but is solid below that temperature. In some embodiments, the thermoset polymer comprises a cross-linked polymer. Thermoset polymers include, but are not limited to, epoxys, polyurethanes, cyanoacrylates, acrylic polymers (e.g., methacrylates) and mixtures and/or combinations thereof.

The term "resin" when used with regard to a thermosetting polymer can refer to a polymer precursor or a mixture of polymer precursors that can be further cured (i.e., via further polymerization and/or crosslinking).

The terms "cure", "curing", and "cured" as used herein can refers to the hardening of a solid thermoset polymer from its precursors (e.g. via cross-linking of polymer chains in a thermoset polymer resin). Curing can be done thermally, chemically, or via application of ionizing radiation, such as but not limited to electron beam, x-ray, gamma, photo with photo initiators, and/or ultraviolet (UV)). In some embodiments, the "curing" and its variations refers to the curing of a thermoset adhesive.

The term "additive manufacturing" as used herein refers to a process wherein successive layers of material are laid down under computer control. The three-dimensional objects can be prepared using additive manufacturing having almost any shape or geometry and can be produced from a model or other electronic data source.

The term "nano" as in "nanoparticles" as used herein refers to a structure having at least one region with a dimension (e.g., length, width, diameter, etc.) of less than about 1,000 nm. In some embodiments, the dimension is smaller (e.g., less than about 500 nm, less than about 250 nm, less than about 200 nm, less than about 150 nm, less than about 125 nm, less than about 100 nm, less than about 80 nm, less than about 70 nm, less than about 60 nm, less than about 50 nm, less than about 40 nm, less than about 30 nm or even less than about 20 nm). In some embodiments, the dimension is between about 20 nm and about 250 nm (e.g., about 20, 30, 40, 50, 60, 70, 80, 90, 100, 110, 120, 130, 140, 150, 160, 170, 180, 190, 200, 210, 220, 230, 240, or 250 nm).

The term "micro" as in "microparticles", "microspheres" or "microballoons" as used herein refers to a structure having at least one region with a dimension (e.g., a length, width, diameter, etc.) of less than 1000 microns (μm), but at least about 1 μm. In some embodiments, the dimension is smaller (e.g., less than about 500 μm, less than about 250 μm, less than about 200 μm, less than about 150 μm, less than about 125 μm, less than about 100 μm, less than about 80 μm, less than about 70 μm, less than about 60 μm, less than about 50 μm, less than about 40 μm, less than about 30 μm or even less than about 20 μm). In some embodiments, the dimension is between about 20 μm and about 250 μm (e.g., about 20, 30, 40, 50, 60, 70, 80, 90, 100, 110, 120, 130, 140, 150, 160, 170, 180, 190, 200, 210, 220, 230, 240, or 250 μm).

In some embodiments, the nano- or microparticles described herein can be approximately spherical. When the particles are approximately spherical, the characteristic dimension can correspond to the diameter of the sphere. In addition to spherical shapes, the particles can be discshaped, plate-shaped (e.g., hexagonally plate-like), oblong, polyhedral, rod-shaped, cubic, or irregularly-shaped.

II. Additive Manufacturing of Syntactic Foam Objects

Syntactic foams are a class of composite materials created by binding hollow spherical filler particles within a matrix and are characterized as exhibiting a high strength-to-density ratio. Particular properties of these foams can be tailored through factors such as relative loading of constituent microspheres, matrix material composition, and degree of heat treatment during post-processing. This combination of characteristics has garnered widespread study of syntactic foams for applications such as boat hull insulation, underwater vehicle buoyancy modules, and lightweight aircraft components throughout the past several decades.

In some embodiments, the presently disclosed subject matter provides a method of preparing a syntactic foam object. In some embodiments, the syntactic foam object is prepared by an additive manufacturing process, such as a direct-write (DW) 3D printing technique. In some embodiments, the syntactic foam object is prepared by sequentially depositing at least two layers of a syntactic foam ink formulation, wherein each layer is deposited on at least a portion of a surface (e.g., a top surface) of a previously deposited layer (e.g., the most recently previously deposited layer). In some embodiments, the object is at least about 2-3 mm in height.

In some embodiments, the presently disclosed subject matter provides a method of preparing a three-dimensional syntactic foam object, the method comprising: (a) providing a curable composition (also referred to herein as an "ink composition", an "ink formulation", or just as an "ink") comprising a polymeric resin (e.g., a thermosetting resin), a curing agent, a plurality of hollow spheres, a solvent, and, optionally, one or more non-hollow filler; (b) depositing a first layer of the curable composition (e.g., on a support surface, such as on a solid surface or a polymer mesh comprising a polymer that does not interact with the polymeric resin); (c) depositing one or more additional layers of the curable composition on the first layer sequentially, thereby forming a three-dimensional curable object; and (d) curing the three-dimensional curable object, thereby providing the three-dimensional syntactic foam object. For example, the curable composition can be loaded into a print head that can extrude the curable composition. The print head can comprise an extruder, such as a syringe, attached to a nozzle that can deposit a thin line (or "bead") of the curable composition, e.g., as directed by a computer. For instance, the print head can be mounted on a computer numeric controlled (CNC) machine with controlled motion along at least the x-, y-, and z-axes.

The curable compositions of the presently disclosed subject matter can be designed to provide for smooth, continuous flow during deposition (e.g., printing). In some embodiments, the composition can be prepared with non-toxic constituents and/or to provide a low-density product. In particular, the selection and/or amount of solvent can provide a curable composition/ink that can enable printing without the need for high extrusion pressures (e.g., pressures above about 100 psi, above about 75 psi, or above about 50 psi) and/or that can remain free from collection/aggregation of the spheres in the print head nozzle. In some embodiments, the solvent can be selected to impart flowable properties to the composition while in the print head and during deposition, but then to evaporate and in the process transition the composition from flowable to solid or jammed. Thus, the presently disclosed inks are designed to be below the jamming limit of the microballoons (about 60-65 vol %) in the as-formulated state, but to be close to that limit so that as soon as a small amount of solvent has evaporated after printing, the compositions are locked in place where they were deposited. After that, the rest of the solvent slowly evaporates, but shrinkage is prevented by the rigid network of microballoons, leading to the characteristic 3-phase microstructure of syntactic foams (e.g., matrix, hollow sphere, and void space). Evaporation of the solvent after printing can produce an object comprising a high weight fraction of the hollow spheres (e.g., about 40 wt % or more, up to about 60 wt %) resulting in a low density, 3D printed cured object.

In some embodiments, the inclusion of one or more non-hollow filler that can modify (e.g., increase) the viscosity of the curable composition can help to improve the stability and uniformity of the suspension of the hollow spheres (e.g., to prevent settling or creaming) and/or to further help provide a printed bead of the curable composition that can hold its shape until cured. In some embodiments, at least one of the one or more non-hollow filler can not only modify viscosity but can also influence the functional properties (e.g., thermal and/or electrical conductivity) of the cured foam, as well.

In some embodiments, providing the curable composition comprises providing a solvent or solvent mixture and adding one or more thermoset resins to the solvent or solvent mixture, optionally along with a hardener or curing agent suitable for curing the thermoset resin. The resin and curing agent can be mixed with the solvent mixture via any suitable means to dissolve the resin and curing agent and provide a substantially homogenous solution. The hollow spheres can then be added and the resulting mixture mixed in any suitable manner to provide a homogeneous suspension, e.g., that does not damage the hollow spheres or result in their sedimentation. In some embodiments, the mixing is performed via planetary mixing. In some embodiments, the mixing comprises sonication, impeller mixing, paddle mixing, centrifugal mixing or resonant acoustic mixing (RAM). In some embodiments, the mixing is performed at between about 1500 and about 1800 rpm (e.g., about 1500, 1600, 1700 or about 1800 rpm). Additional components, such as non-hollow fillers (e.g., nanoclay, etc.) can then be added and mixed (e.g., via centrifugal mixing).

In some embodiments, the curable composition comprises at least about 20 weight % (wt %) of the solvent. Suitable solvents include those that do not react with the thermoset resin or curing agent and which have a boiling temperature above room temperature (e.g., above about 40° C. or above about 50° C.), but below or at about the cure temperature of the resin. In some embodiments, the solvent has a boiling point between about 50° C. and about 210° C. In some embodiments, the solvent is a mixture of solvents. In some embodiments, the solvent is matched to the resin. For example, when the resin is an epoxy resin, the solvent can be or comprise an alcohol (e.g., ethanol) and/or acetone. When the resin is a silicone resin, the solvent can be or comprise hexane. When the resin includes a polycarbosilane, the solvent can include toluene. In some embodiments, the solvent comprises water. For example, in some embodiments, the resin is a phenolic resin and the solvent can comprise water. In some embodiments, e.g., in the examples herein involving epoxy resin, the solvent is a mixture of methyl ethyl ketone (MEK), acetone, and camphor. In some embodiments, the solvent comprises one or more of MEK, acetone and camphor. In some embodiments, camphor or another relatively higher boiling point compound (e.g., having a boiling point greater than about 100, 125, 150, 175 or about 200° C.) is included as one of the solvents of a solvent mixture. The higher boiling point solvent can be included to evaporate more slowly than any lower boiling point solvents included in the composition and can, for example, increase the print life of the ink.

In some embodiments, the curable composition comprises between about 30 wt % and about 55 wt % of the solvent (e.g., about 30, 31, 32, 33, 34, 35, 36, 37, 38, 39, 40, 41, 42, 43, 44, 45, 46, 47, 48, 49, 50, 51, 52, 53, 54, or about 55 wt % of the solvent.) In some embodiments, the curable composition comprises between about 5 wt % and about 25 wt % of the thermoset resin (e.g., about 5, 6, 7, 8, 9, 10, 11, 12, 13, 14, 15, 16, 17, 18, 19, 20, 21, 22, 23, 24, or about 25 wt % of the resin). Typically, the amount of curing agent can depend on the amount of resin. In some embodiments, the composition comprises about 0.1 wt % to about 6 wt % of the curing agent. In some embodiments, the curable composition comprises about 20 wt % to about 40 wt % of the hollow spheres (e.g., about 20, 21, 22, 23, 24, 25, 26, 27, 28, 29, 30, 31, 32, 33, 34, 35, 36, 37, 38, 39 or about 40 wt % of the hollow spheres. In some embodiments, the composition can include at least about 0.1 wt %, about 0.5 wt %, about 1 wt % or about 2 wt % of one or more non-hollow, viscosity modifying filler. In some embodiments, the composition can include up to about 25 wt % of one or more non-hollow, viscosity modifying filler. In some embodiments, the composition includes up to about 10 wt % of one or more non-hollow, viscosity modifying filler (e.g., about 1, 2, 3, 4, 5, 6, 7, 8, 9, or about 10 wt % of one or more non-hollow filler). In some embodiments, the curable composition comprises: (i) about 5 wt % to about 25 wt % of the thermoset resin; (ii) about 0.1 wt % to about 6 wt % of the curing agent; (iii) about 20 wt % to about 40 wt % of the hollow spheres; (iv) about 30 wt % to about 55 wt % of the solvent; and (v) about 0.1 wt % to about 25 wt % of the non-hollow/viscosity modifying filler.

In some embodiments, the thermosetting resin in an epoxy resin. The epoxy resin can comprise a compound including at least one epoxide (oxirane) group. Suitable curing (or hardening) agents for epoxy resins include, for example, amines, anhydrides, guanidines, ureas, imidazoles, or combinations thereof, as described further hereinbelow.

In some embodiments, the epoxy resin comprises a plurality of (i.e., at least two) epoxy groups per molecule. For example, glycidyl ethers having at least about two epoxy groups per molecule are suitable as epoxy resins for the ink compositions of the presently disclosed subject matter. The polyepoxides can be saturated, unsaturated, cyclic or acyclic, aliphatic, alicyclic, aromatic or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)methane), bisphenol S, bis(4-hydroxyphenyl)-1,1-isobutane, fluorene 4,4'-dihydroxybenzophenone, bis(4-hydroxyphenyl)-1,1-ethane, bisphenol Z (4,4'-Cyclohexylidenebisphenol), and 1,5-hydroxynaphthalene. Other suitable polyphenols which can be used as the basis for the polyglycidyl ethers are the novolac resin-type condensation products of phenol and formaldehyde or acetaldehyde which are usually liquid at ambient temperature. In some embodiments, the epoxy resin includes an epoxy resin sold under the tradename EPON™ from Hexion (Columbus, Ohio, United States of America), such as EPON™ 826 or EPON™ 164.

The epoxy resin can be selected and used in a sufficient amount to provide adequate wetting and adhesion to the hollow spheres (e.g., microspheres) and to provide a polymeric matrix in the cured product sufficient to sustain a unitary composite material. Epoxy resins generally provide superior durability in undersea applications as compared to some other curable resins, such as typical polyurethanes. However, although the matrix resin is exemplified as an epoxy resin herein, it is not necessarily limited thereto. Depending on the particular conditions (e.g., air, water or ground conditions) to which the 3D printed object is expected to be exposed, suitable resins can include other resins (e.g., other thermoset resins) and can be readily selected by those skilled in the art, usually dependent in at least part on the desired application. Illustrative examples of other thermosets include, but are not limited to polyester, polyurethane, polyurea, silicone, polysulfide, and phenolic resins.

By the term "curing agent" is meant a reactive component capable of either reacting with the resin, catalyzing the polymerization of the resin and/or crosslinking the resin. For example, when the thermoset resin is an epoxy resin, the curing agent can be a compound capable of reacting with the epoxy functional group and/or polymerizing the epoxy resin. Where the curable composition is to be cured at elevated temperature, the curing agent (hardener) can be capable of accomplishing cross-linking or curing of certain of the components of the composition when the material is heated to a temperature in excess of room temperature. When used, the curing agent should not be activated at ambient temperature, e.g., to provide for a formulation that is stable and/or printable at room temperature.

Suitable curing agents (e.g., for epoxy resins) include, but are not limited to guanidines, substituted guanidines, substituted ureas, melamine resins, guanamine derivatives, blocked amines, aromatic amines and/or mixtures thereof. Examples of substituted guanidines include, but are not limited to methylguanidine, dimethylguanidine, trimethylguanidine, tetramethylguanidine, methylisobiguanidine, dimethylisobiguanidine, tetramethylisobiguanidine, hexamethylisobiguanidine, heptamethyl-isobiguanidine and cyanoguanidine (dicyandiamide). Representative guanamine derivatives include alkylated benzoguanamine resins, benzoguanamine resins or methoxymethylethoxy-methylbenzoguanamine. The amount of curing agent utilized can depend upon a number of factors, including whether the curing agent acts as a catalyst or participates directly in the cross-linking of the composition, the concentration of epoxy groups and other reactive groups in the composition, the desired curing rate, and so forth.

More generally, the curing agent can have relatively low molecular weight and reactive functionalities which are phenolic, hydroxyl, amine, amide, or anhydride. In some embodiments, the curing agent is a monomeric or oligomeric amine functional polyarylene wherein between the arylene groups are covalent bridges such as in the diaminodiphenyls, or connecting groups selected from the group consisting of alkylene of from 1-8 carbon atoms, ether, sulfone, ketone, carbonate, carboxylate, carboxamide and the like. In some embodiments, the curing agent is diaminodiphenylsulfone (DDS). In some embodiments, the curing agent is dicyandiamide.

In some embodiments, the ink can include a curing agent accelerator, such as, but not limited to a substituted urea (e.g., dimethyl urea).

The hollow spheres can be any suitable hollow spheres. In some embodiments, the hollow spheres can comprise hollow microspheres and/or nanospheres. The hollow spheres can be chosen based on their density, which can be modified based on the thickness of the walls of the hollow spheres. In some embodiments, the hollow spheres comprise hollow microspheres. The shells or walls of the hollow microspheres can be formed of glass, e.g., silica or borosilicates; ceramic, e.g., fly ash; or even polymers, such as phenolics. In some embodiments, the plurality of hollow spheres comprises hollow glass microspheres (or hollow glass microballoons (GMBs)). Glass microspheres tend to have lower thermal conductivity than ceramic microspheres. Glass microspheres are commercially available, for example, from Minnesota Mining & Manufacturing Co. (3M, St. Paul, Minnesota, United States of America) such as K or S series microbubbles (e.g., K37 glass bubbles) or D32 glass microballoons. Silica microballoons of this type are also available under the trademark Eccospheres from Trelleborg Emerson & Cuming, Inc. (Randolph, Mass., United States of America). The glass microspheres can be sodium-borosilicate based glass microspheres or other silica or silicate glass materials. As indicated, the syntactic foam composition can be formulated to provide from about 35 wt % to about 60 wt % hollow microspheres in the cured product. Sufficient microspheres are included in the foam formulation to adjust the density and control the thermal conductivity properties of the finished foam product to desired levels.

As described hereinabove, in some embodiments, the curable composition can further include one or more a non-hollow filler. In some embodiments, the non-hollow filler acts as a viscosity modifier, e.g., improving the stability of the suspension of hollow spheres. Exemplary non-hollow fillers include silica, diatomaceous earth, clay (e.g., nanoclay), talc, glass, carbon or ceramic fibers, nylon or polyamide fibers, and the like. The clays that can be used as fillers include, for instance, clays from the kaolinite, illite, chloritem, smecitite or sepiolite groups, which can be calcined. Examples of suitable fillers include, without limitation, talc, vermiculite, pyrophyllite, sauconite, saponite, nontronite, montmorillonite or mixtures thereof. The clays can also include minor amounts of other ingredients such as carbonates, feldspars, micas and quartz. The fillers can also include ammonium chlorides such as dimethyl ammonium chloride and dimethyl benzyl ammonium chloride. Titanium dioxide can also be employed. In some embodiments, one or more mineral or stone type fillers, such as calcium carbonated, sodium carbonate, or the like can be used. In some embodiments, silicate minerals, such as mica can be used. In some embodiments, the viscosity modifying filler is selected for compatibility to both the resin and the solvent. For example, untreated (hydrophilic) fumed silica works can be used a composition comprising an aqueous phenolic resin. In some embodiments, functionalized (hydrophobic) fumed silica can be used in compositions comprising MEK/acetone/epoxy combinations.

In some embodiments, the non-hollow filler can also be used to modify the thermal conductivity and/or electrical conductivity of the resulting foams. For example, in some embodiments, the non-hollow filler can be selected from aluminum nitride, silicon carbide particles, silicon carbide microfibers, silicon nitride, graphene, carbon black, carbon fiber, boron nitride nanoparticles, boron nitride nanotubes, carbon nanotubes. Graphene, for example, can increase electrical and thermal conductivity, while boron nitride nanoparticles (e.g., hexagonal boron nitride nanoparticles (hBN)) can increase thermal conductivity.

Other additives, agents or performance modifiers can also be included in the curable composition, including but not limited to, an antioxidant, a UV resistant agent, a heat stabilizer, a colorant, a processing aid, a lubricant, and a reinforcement. Liquid polysufides, e.g., epoxidized polysulfides can be used to improve resistance to environmental exposure, such as exposure to humidity and salt water.

In some embodiments, the curable composition/ink is prepared just prior to step (b), e.g., within about 48 hours of printing. However, the composition can also be prepared and stored prior to step (b). If necessary, the composition can be thinned by addition of additional solvent (e.g., acetone) and suitable mixing (e.g., centrifugal mixing), prior to being loaded into the extruder. The consistency of the curable composition should be such that it provides minimal resistance to manual force applied via a laboratory spatula. In some embodiments, the extruder (e.g., which in some embodiments, can comprise a syringe) can be sealed (e.g., by coating the plunger with vacuum grease) to reduce exposure of the curable composition to air, thereby reducing or eliminating solvent evaporation during printing. In some embodiments, the pressure used during deposition can be adjusted during printing to maintain an even flow of the curable composition. In some embodiments, the pressure can be maintained between about 20 psi and about 75 psi (e.g., about 20, 25, 30, 35, 40, 45, 50, 55, 60, 65, 70, or about 75 psi). In some embodiments, the pressure can be maintained at about 35 psi to about 75 psi. In some embodiments, the pressure can be maintained at about 45 psi or below.

In some embodiments, the bead of curable composition deposited can have a width or diameter of about 1 mm or less. In some embodiments, the bead can have a width or diameter of about 0.9 mm, about 0.8 mm, about 0.7 mm, or about 0.6 mm. In some embodiments, the print speed is about 1000 mm/min or more (e.g., about 1000, 1100, 1200, 1300, or about 1400 mm/min). In some embodiments, the deposition comprises depositing a first layer of the curable composition on a support surface. In some embodiments, the support surface comprises a flat mesh surface, where the mesh comprises a material that does not react with the resin (e.g., a polytetrafluoroethylene (PTFE) mesh). Prior to or after curing, the printed object can be removed from the support surface.

In some embodiments, the method can comprise depositing at least two layers of the curable composition. In some embodiments, the method can comprise depositing at least 5, 10, 15, 20, 25, 30, 40, 45, 50, 60, 70, 80, 90, 100, 200, 300, 400, 500, 1000 or more layers of the curable composition sequentially. In some embodiments, the 3D curable object has at least one dimension (e.g., height) that is at least about 2 mm or more or at least about 3 mm or more. In some embodiments, the object has at least one dimension that is at least about 10 mm or more.

In some embodiments, the curing can be performed by heating the curable object or exposing the object to UV radiation. The curing temperature can depend upon the composition of the resin and/or curing agent. In some embodiments, the curing is performed by heating the object to at least about 150° C. for a period of time (e.g., a few hours or a few days). In some embodiments, the curing comprises heating to about 150° C. for about four hours and then heating the object to about 200° C. for between about 16 hours and about 3 days.

In some embodiments, the curable object can be pre-cured to remove some or all of the solvent prior to curing. Thus, in some embodiments, the method further comprises pre-curing the three-dimensional curable object prepared in step (c) prior to step (d), wherein the pre-curing comprises heating the three-dimensional curable object to a first temperature (e.g., in an oven or furnace) for a first period of time, wherein the first temperature is a temperature lower than a temperature used to cure the curable object. In some embodiments, the first temperature is about 50 degrees Celsius (° C.) to about 100° C. (e.g., about 50, 55, 60, 65, 70, 75, 80, 85, 90, 95 or about 100° C.). In some embodiments, the first period of time is about 4 hours to about 3 days (e.g., 4, 8, 12, 16, 20, 24, 28, 32, 36, 40, 44, 48, 52, 56, 60, 64, 68, or about 72 hours). As described in the examples below, pre-curing the curable object can help the object to keep its as-printed shape more closely during curing, e.g., avoiding "ballooning" and/or can provide a cured object with a more consistent or desirable color.

In some embodiments, e.g., to reduce the amount of polymeric matrix and thereby reduce foam density, the cured object can be pyrolyzed. Thus, in some embodiments, the method further comprises: (e) pyrolyzing the three-dimensional syntactic foam object at a second temperature for a second period of time. In some embodiments, the second temperature is about 600° C. to about 1000° C. (e.g., about 600, 650, 700, 750, 800, 850, 900, 950 or about 1000° C.). Additionally or alternatively, the architecture of the printed, uncured object can be varied to alter the density of the cured object.

In some embodiments, the three-dimensional syntactic foam object has a density of about 0.38 grams per cubic centimeter (g/cc) or less. In some embodiments, the object has a density of about 0.30 g/cc or less (e.g., about 0.30, 0.29, 0.28, 0.27, 0.26. 0.25, 0.24, 0.23, or about 0.22 g/cc or less). In some embodiments, the object has a density of about 0.21 g/cc or about 0.20 g/cc or less. In some embodiments, the object has a density of about 0.08 g/cc to about 0.21 g/cc (e.g., about 0.08, 0.09, 0.10, 0.11, 0.12, 0.13, 0.14, 0.15, 0.16, 0.17, 0.18, 0.19, 0.20, or about 0.21 g/cc).

In some embodiments, the presently disclosed subject matter provides a syntactic foam object prepared by the presently disclosed method. Thus, in some embodiments, the presently disclosed subject matter provides a 3D syntactic foam object with a height of at least about 2 mm and a density of about 0.21 g/cc or less (e.g., about 0.20, 0.19, 0.18, 0.17, 0.16, 0.15, 0.14, 0.13, or 0.12 g/cc or less). In some embodiments, the object has a compressive strength of at least about 1 MPa (e.g., in the printed Z direction). In some embodiments, the object has a compressive strength of between about 1 MPa and about 10 MPa. In some embodiments, the syntactic foam object comprises about 35 to about 60 wt % hollow spheres (e.g., about 35, 40, 45, 50, 55, or about 60 wt % hollow spheres). In some embodiments, the object further comprises up to about 15 wt % of a non-hollow filler.

III. Ink Compositions for Additive Manufacturing

In some embodiments, the presently disclosed subject matter provides an ink composition for direct write additive manufacture of a syntactic foam. The term "ink" as used herein refers to an ink for use in an additive manufacturing process that can be "written", extruded, printed or otherwise deposited to form a layer that substantially retains its as-deposited geometry and shape with perhaps some, but preferably not excessive, sagging, slumping, or other deformation, even when deposited onto other layers of ink, and/or when other layers of ink are deposited onto the layer. As such, skilled artisans will understand the presently described inks to exhibit appropriate rheological properties to allow the formation of monolithic structures via deposition of multiple layers of the ink (or in some cases multiple inks with different compositions) in sequence.

A common method of additive manufacturing, or 3D printing, can include forming and extruding a bead of flowable material (e.g., uncured thermoset resin ink) and applying the bead of material in a strata of layers to form a facsimile of an article. Such a process can be achieved using an extruder mounted on a computer numeric controlled (CNC) machine with controlled motion along at least the x-, y-, and z-axes.

In some embodiments, the ink composition comprises a thermoset resin, a curing agent, a plurality of hollow spheres (e.g., micro- and/or nanospheres), and a solvent. The composition can further comprise a non-hollow/viscosity modifying filler and/or one or more other additives.

In some embodiments, the presently disclosed ink composition comprises: (i) about 5 weight wt % to about 25 wt % of a thermoset resin; (ii) about 0.1 wt % to about 6 wt % of a curing agent; (iii) about 20 wt % to about 40 wt % of hollow spheres; (iv) about 30 wt % to about 55 wt % of solvent; and (v) about 0.1 wt % to about 25 wt % of non-hollow filler (e.g., a non-hollow/viscosity modifying filler).

Suitable thermoset resins, curing agents, hollow spheres, solvents, non-hollow/viscosity modifying fillers and other optional additives are described hereinabove with regard to the curable composition for the method of preparing the 3D syntactic foam object. In some embodiments, the thermoset resin is an epoxy resin. In some embodiments, the curing agent is an amine. In some embodiments, the curing agent is DDS or dicyandiamide. In some embodiments, the hollow spheres comprise hollow glass microspheres or GMBs. In some embodiments, the solvent comprises one or more of MEK, acetone, and camphor. In some embodiments, the ink comprises a filler selected from a nanoclay and fumed silica. In some embodiments, the ink further comprises graphene, boron nitride nanoparticles (e.g., hBN) or another filler that modifies electrical and/or thermal conductivity.

The presently disclosed inks can be prepared by adding solid materials to the solvent or solvent mixture used in the ink. Thus, in some embodiments, a mixture of solvents is first prepared and then the other components of the ink added thereto. Mixing can be performed by any suitable method that generally avoids destruction of the hollow spheres or their sedimentation or separation from the rest of the ink components. In some embodiments, the mixing can be performed using a planetary mixer (e.g., a planetary centrifugal mixer).

Figure 23:
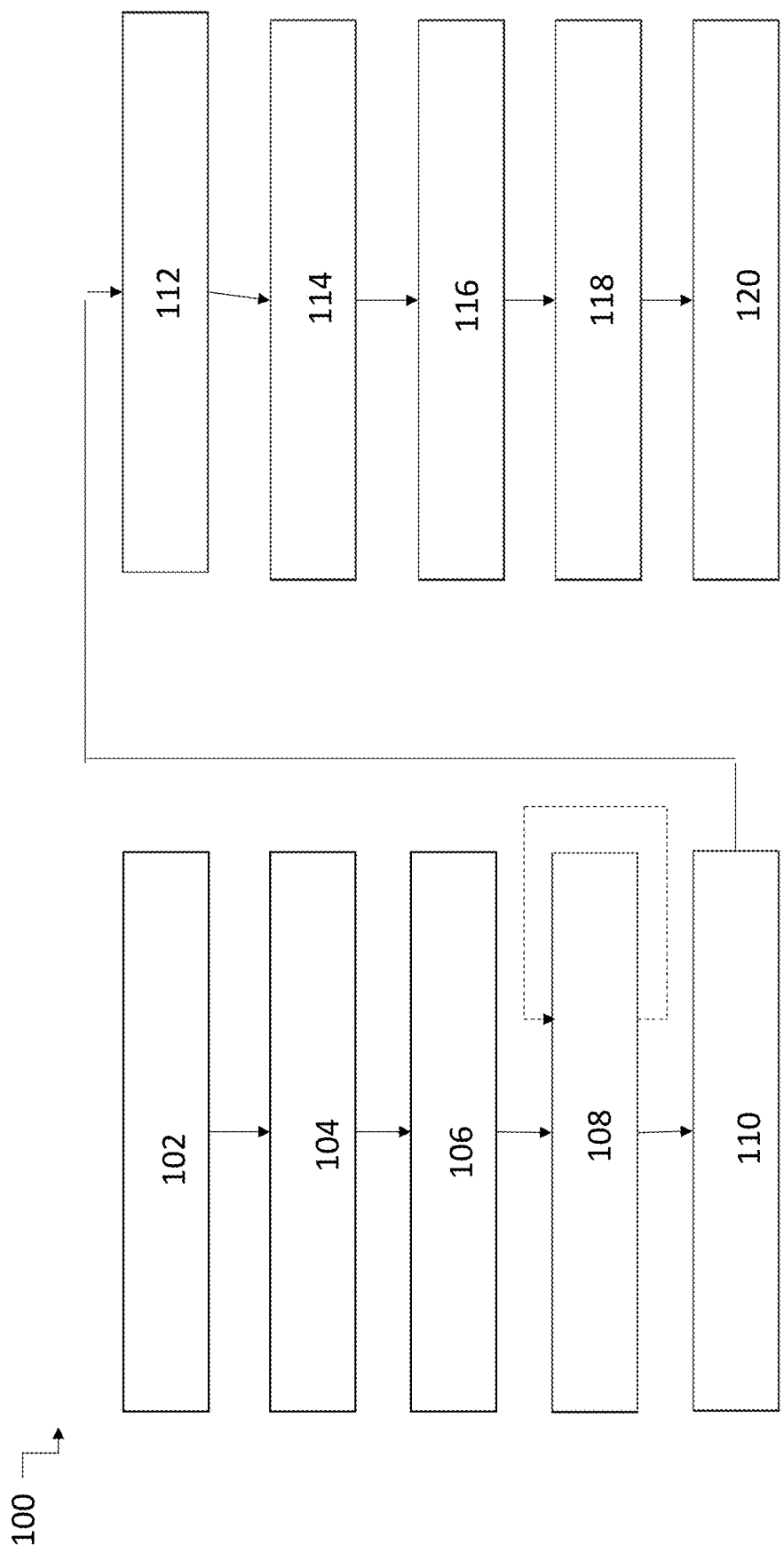
FIG. 23 is a schematic diagram of an exemplary method of preparing a syntactic foam ink according to the presently disclosed subject matter.

FIG. 23 shows exemplary method 100 for preparing a syntactic foam ink of the presently disclosed subject matter. In first step 102, solvents are combined in a container, such as a round bottomed container. In step 104, the solvents are mixed, e.g., using a planetary mixer. In step 106, the thermoset resin and a curing agent or harder are added to the solvent mixture. The resulting mixture is then mixed in step 108. As indicated by the dotted line, step 108 can be repeated as necessary until all solids from the resin and curing agent have visibly dissolved in the solvent mixture. In step 110, the hollow spheres (e.g., hollow glass microballoons) are added and, in step 112, the mixture is again mixed to provide a homogeneous suspension of the spheres. In step 114, other components of the ink, such as nanoclay or fumed silica can be added to the mixture. After the addition of the other components, the mixture is again mixed in step 116. In step 118, the sides of the container are scraped and the mixture mixed in step 120. At this point, the ink can be stored until use or directly loaded into an extruder of a print head, such as a syringe, for DW 3D printing. In some embodiments, any of mixing steps 104, 108, 112, 116, and 120 can be performed using a planetary mixer, using sonication, an impeller, a paddle, centrifugal mixing, or RAM.

Accordingly, in some embodiments, the presently disclosed subject matter provides a method of preparing an ink composition for additive manufacturing of a three-dimensional syntactic foam object, the method comprising: (a) adding a thermoset resin and a curing agent to a solvent or solvent mixture, thereby providing a first mixture and mixing the first mixture using a centrifugal mixer until any solids are dissolved; and (b) adding a plurality of hollow spheres to the first mixture, thereby providing a second mixture, and mixing the second mixture using a centrifugal mixer, thereby preparing the ink composition. In some embodiments, the method further comprises adding a filler (e.g., a non-hollow/viscosity modifying filler) and/or other additive to the second mixture to provide a third mixture and mixing the third mixture using a centrifugal mixer. In some embodiments, the method further comprises loading the ink composition into a syringe or other extrusion device. In some embodiments, the loading can comprise the use of a device (such as a filter disk) designed to minimize the introduction of air into the ink. In some embodiments, the method comprises storing the ink for a period of time. In some embodiments, the stored ink can be reconstituted by addition of a solvent (e.g., acetone) and centrifugal mixing.

EXAMPLES

The following Examples are included to further illustrate various embodiments of the presently disclosed subject matter. However, those of ordinary skill in the art should, in light of the present disclosure, appreciate that many changes can be made in the specific embodiments which are disclosed and still obtain a like or similar result without departing from the spirit and scope of the presently disclosed subject matter.

Example 1

Syntactic Foam Ink for Additive Manufacturing

A foam ink was prepared using a epichlorohydrin/cresol novolac epoxy resin (EPON™ 164, Hexion, Columbus, Ohio, United States of America), also referred to herein as "Epoxy resin A", as the thermoset polymer resin and diaminodiphenylsulfone (DDS) as the curing agent according to the amounts described in Table 1, below. This ink is also referred to herein as "Formula I".

To prepare the ink, the solvents, methyl ethyl ketone (MEK), acetone, and camphor, were first combined in a FlackTek PP100 plastic mixing cup (FlackTek, Inc., Landrum, South Carolina, United States of America) and mixed using a centrifugal planetary mixer (FLACKTEK SPEEDMIXER™, FlackTek, Inc., Landrum, South Carolina, United States of America) at 1500 revolutions-per-minute (rpm) for 2 hours without vacuum to fully dissolve the camphor. The epoxy resin and DDS were added as solid bead and powder respectively, and the resulting mixture mixed using the centrifugal planetary mixer at 1600 rpm in six-minute increments until the resin and DDS were fully dissolved. Glass microballoons (D32 GMBs (32 g/cc density), 3M, St. Paul, Minnesota, United States of America) were added to the resin mixture and the resulting mixture mixed suing the centrifugal planetary mixer for 2 minutes at 1600 rpm without vacuum. The sides of the mixing cup were scraped with a laboratory spatula to ensure that all of the GMBs were incorporated in the mixture. As a rheological enhancer, GARAMITE™ 7305 nanoclay (BYK USA, Wallingford, Connecticut, United States of America) was then added to the mixture and the mixture was mixed for a further 2 minutes at 1800 rpm without vacuum. Again, the sides of the container were scraped with a laboratory spatula to make sure that all of the nanoclay was incorporated, and the mixture mixed an additional 2 minutes at 1800 rpm without vacuum. For printing, the ink was loaded into a syringe directly using a laboratory spatula without centrifuging to make sure the suspension of GMBs remained uniform in the formulation.

TABLE 1

Foam Ink Formula I.

| Constituent | Batch mass (g) | Weight Fraction in ink | Weight Fraction after cure |
| --- | --- | --- | --- |
| Epoxy resin A (EPON™ 164) | 5 | 0.207 | 0.360 |
| DDS | 1.4 | 0.058 | 0.101 |
| Nanoclay | 2 | 0.083 | 0.144 |
| GMBs | 5.5 | 0.228 | 0.395 |
| MEK | 1.5 | 0.062 | 0 |
| Acetone | 1.75 | 0.072 | 0 |
| Camphor | 7 | 0.290 | 0 |

Figure 1:
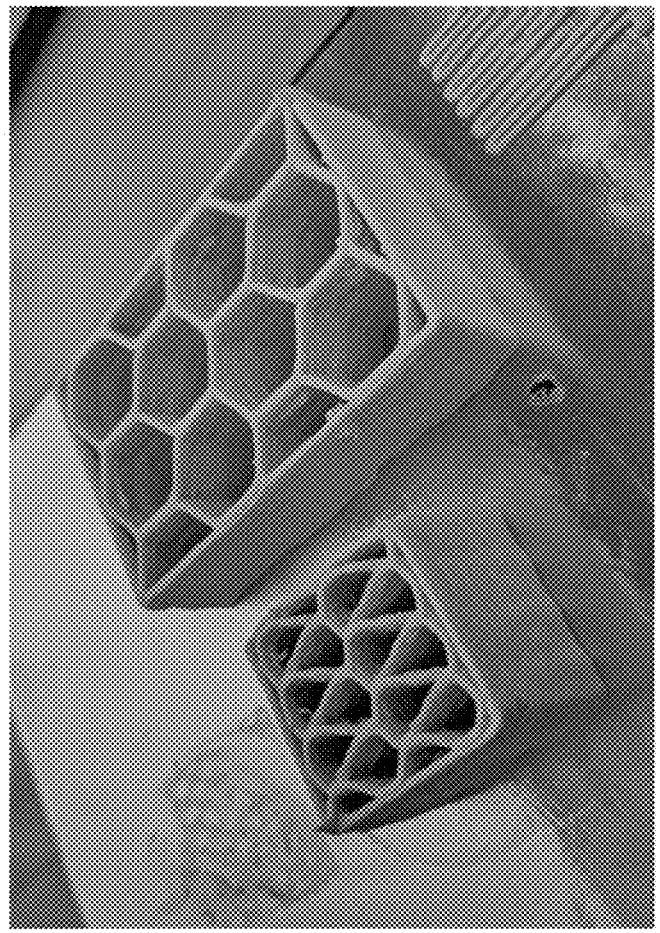
FIG. 1 is photographic image of two exemplary three-dimensional (3D) honeycomb structures as-printed at 1100 millimeters per minute (mm/min) using an exemplary syntactic foam ink of the presently disclosed subject matter comprising an epoxy resin, an amine curing agent, glass microballoons, and nanoclay, also referred to herein as Formula I.

More particularly, for printing, the ink was manually loaded into a Fisnar QUANTX™ round syringe barrel (I & J Fisnar, Inc., Wayne, New Jersey, United States of America) using a laboratory spatula, and a 0.634 mm straight syringe nozzle was attached. Prints were generally performed at speeds between about 1000 mm/min and about 1200 mm/min using a 3-axis computer numerical control (CNC) machine. FIG. 1 is a photographic image of honeycomb samples as-printed at 1100 mm/min.

Because the solvents used in the ink formula evaporated when exposed to air, pressure was modified throughout the printing process as the ink thickened. The pressure was typically varied between 35-75 psi depending on the age of the ink; a newly mixed batch of ink typically had a 36-48 hour printable lifespan before so much of the solvent had evaporated that the material had become too thick and dry to print easily and/or would not adequately stick to the printing substrate. When performing 3D printing for an extended period, this thickening phenomenon was able to be observed within a single print.

After observing this thickening phenomenon, the printing procedure was modified by coating the syringe plunger in vacuum grease before being loaded into the syringe in an attempt to keep air from reaching the ink. This modification noticeably improved the ink's printable lifetime within a one syringe-load and minimized the need to increase pressure multiple times within one print to maintain smooth print flow.

In cases where the ink formula became too dry and/or thick to print smoothly, acetone could be added to the ink then the ink re-mixed at 1600 rpm without vacuum for 2 minutes in order to thin it back to a more printable consistency. This more printable consistency was characterized by minimal resistance to applied manual force via spatula. Reconstitution was feasible in inks up to two weeks of age.

Due to concerns over separation of the GMBs from the rest of the material, the ink formula was not centrifuged prior to syringe loading. Without being bound to any one theory, this is believed to result in the presence of small air pockets in the ink, which resulted in the foam ink "bubbling" during the print when air bubbles were extruded. In some cases, this, in turn, resulted in pockmarks visible on the print surface, or when printing a thin item such as a honeycomb wall, to cause part of the print to buckle or collapse. This phenomenon can be seen in FIG. 2.

In order to reduce the amount of air pockets present within the ink and thus diminish the occurrence of bubbling, the syringe loading procedure was modified to include use of a FlackTek Speed Disk (FlackTeck, Inc., Landrum South Carolina, United States of America). This allowed for material to be directly extruded from the mixing cup into a syringe barrel in one continuous process, eliminating the periodic air pockets generated by filling the syringe manually through multiple spatula-loads. Subsequent prints generated with material loaded in this manner demonstrated no appreciable bubbling phenomena.

In addition, it was found that when printed on flat, fully dense substrates such as glass sheets, prints generated using this ink possessed bottom surfaces that were warped. This was caused due to solvent outgassing from these surfaces without a direct route to the ambient environment. In order to combat this phenomenon, PTFE mesh sheeting was adhered to the substrate surfaces, with printing then occurring on top of the sheeting. The sheeting's constituent holes allowed for solvent to escape from these bottom surfaces with relative ease rather than having to penetrate through the bulk of the print. Prints generated using this type of substrate were found to possess bottom surfaces with less warping.

Example 2

Curing of Printed Objects

Figure 3:
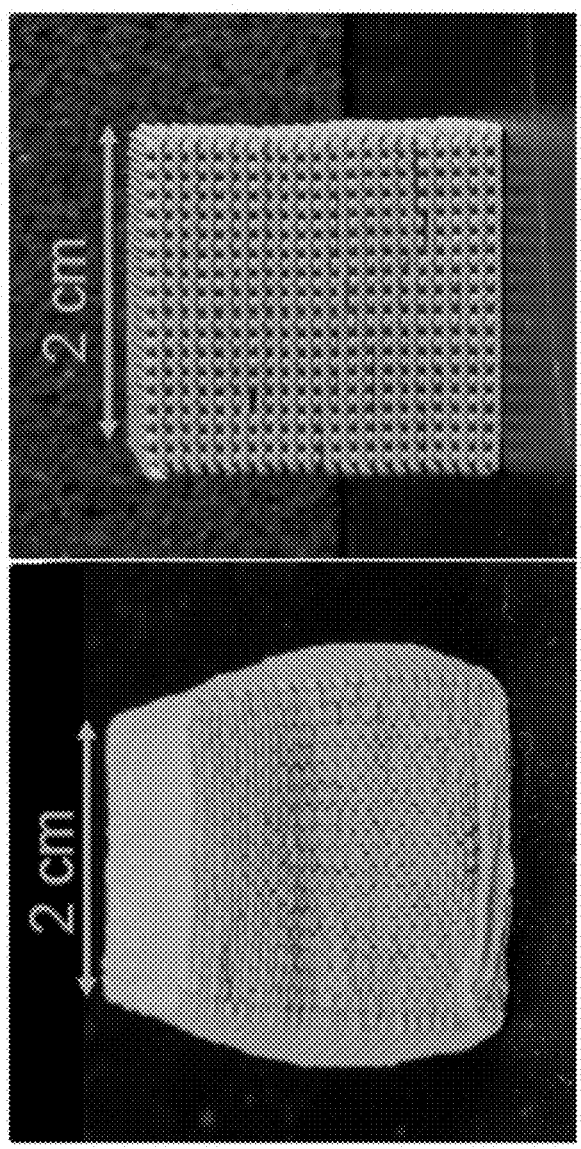
FIG. 3 is a pair of photographic images showing (left) "ballooning" in a three-dimensional (3D) syntactic foam object prepared from Formula I cured according to the epoxy resin manufacturer's curing protocol and (right) a three-dimensional syntactic foam object printed using the same ink and pre-cured prior to undergoing the epoxy resin manufacturer's curing protocol. The arrow over the top of each object indicates a distance of 2 centimeters (cm).
Figure 4:
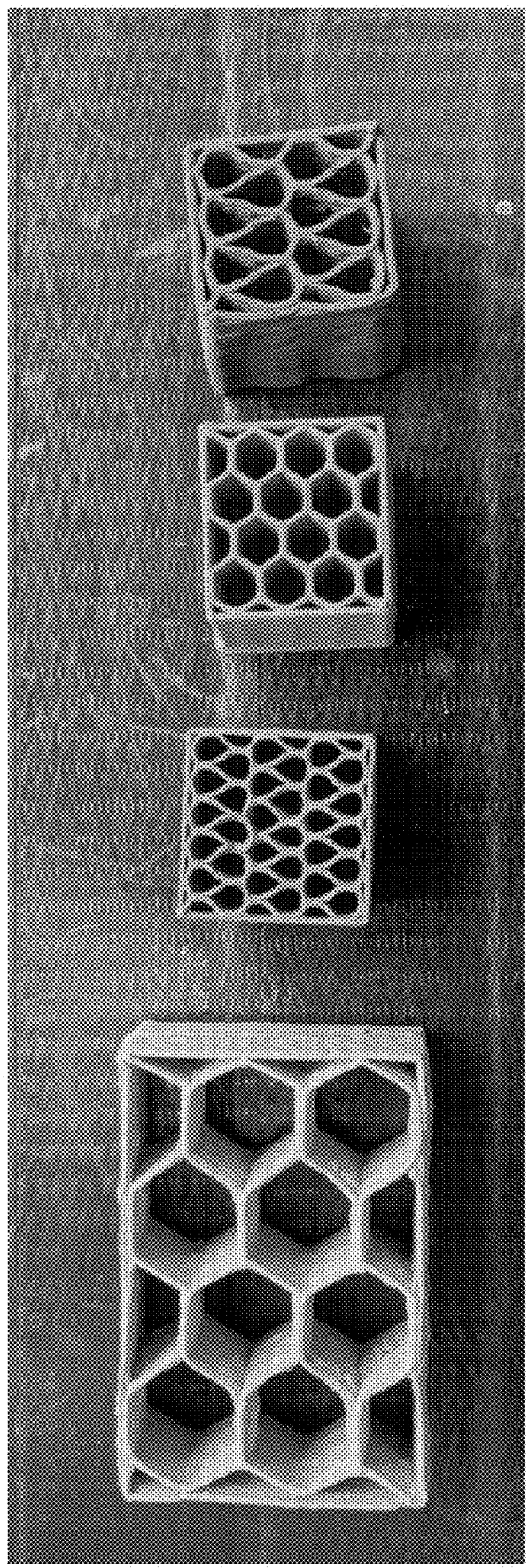
FIG. 4 is a photographic image of four three-dimensional syntactic foam structures showing color variation among different structures printed and cured using an exemplary ink formula of the presently disclosed subject matter (Formula I).
Figure 6:
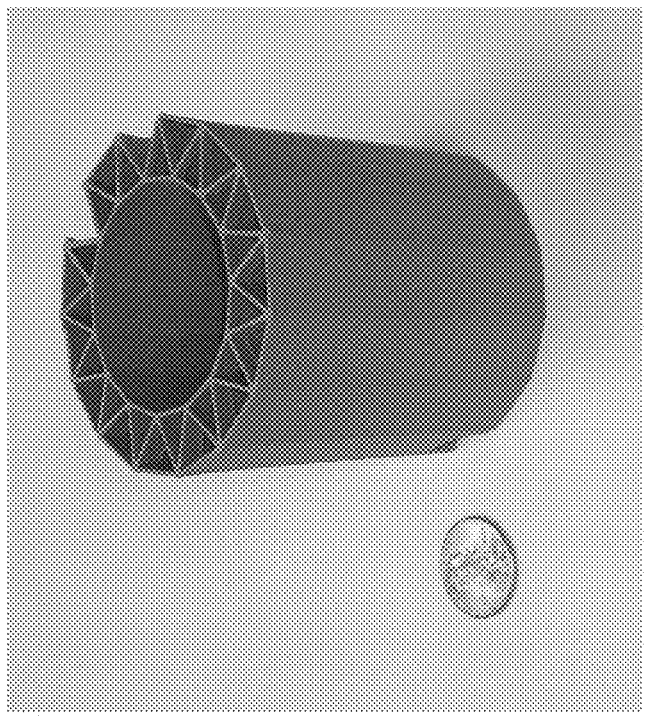
FIG. 6 is a photographic image of a cured three-dimensional object printed using an exemplary ink formula of the presently disclosed subject matter (Formula I). The penny to the left of the object is provided for scale purposes.
Figure 5:
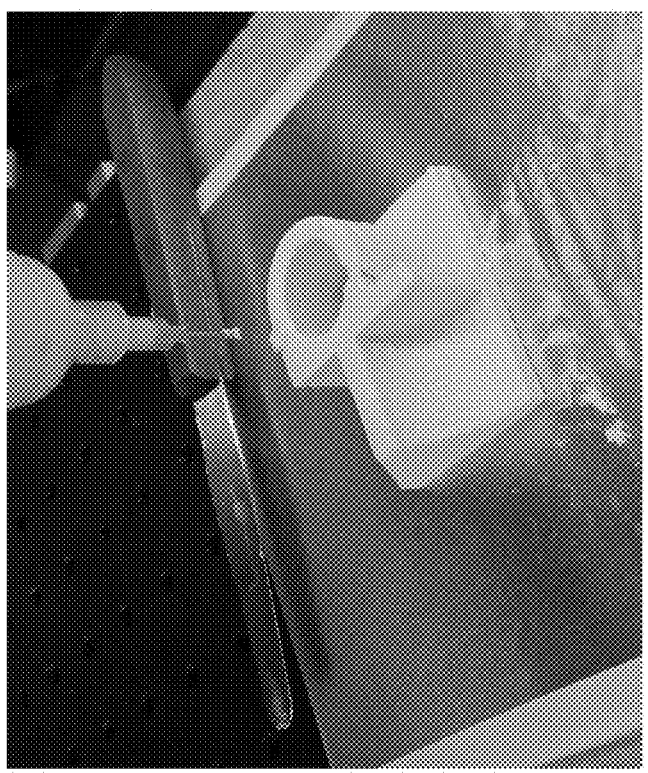
FIG. 5 is a photographic image of an as-printed three-dimensional object printed using an exemplary ink formula of the presently disclosed subject matter (Formula I).

Initial studies of curing the objects printed with the foam ink described in Example 1 were performed according to the manufacturer's recommendations for curing the resin when DDS was used. More particularly initial cure studies were performed by first curing the object for 4 hours at 150° C. followed by 16 hours at 200° C. When objects were approximately 2-3 mm thick or less, performing this cure immediately after printing was sufficient for providing a cured product having a geometry faithful to the as-printed object. However, when thicker objects or more solid objects were cured using this process, they were observed to "balloon" undesirably beyond their original printed footprint as solvent within the bulk printed material attempted to escape simultaneously with the crosslinking of the epoxy resin. See FIG. 3, image on left. Furthermore, it was noted that individual cured prints would often differ in color despite being of the same material. Generally, this ranged from a honey-yellow color to a dark brown. See FIG. 4. Based on the individual conditions (re-constituted vs. new) of the ink used in each print, and without being bound to any one theory, it is believed that greater amounts of solvent present in a print upon its full curing can lead to a darker final color. Additional images of an as-printed object printed using Formula I and a cured object printed using Formula I are shown in FIGS. 5 and 6.

Accordingly, a less aggressive pre-curing step was added to evaporate trapped solvent in prints that were thicker than about 2-3 mm and/or of relatively larger size and/or denser architecture. Several pre-curing environments were investigated for potential use with larger foam ink prints. These included holding the prints at temperatures of 50° C., 80° C., and 100° C. for several hours. The efficacy of each of these environments was initially studied using thermogravimetric analysis (TGA) on small samples of the foam ink. Following analysis of these results, a short full-scale study was performed using printed cube samples placed in a furnace held at 100° C. for 4 hours.

For initial information regarding solvent evaporation from the foam ink, TGA analysis was performed using a TA Instruments TGA Q500 Thermogravimetric Analyzer (TA Instruments, New Castle, Delaware, United States of America). Three samples weighing between approximately 100-180 mg were studied; one sample was tested at each of the isothermal pre-curing temperatures: 50° C., 80° C., and 100° C. These samples underwent a customized heating procedure in which temperature was ramped at a rate of 10° C./min until the desired pre-curing temperature was reached. When this temperature was attained, the sample was held there isothermally for 8 hours as its relative mass loss was observed. After this was complete, the temperature was ramped to 800° C. at 10° C./min in order to pyrolyze the sample. Data was recorded regarding the samples' mass loss over the entire time period.

Figure 7:
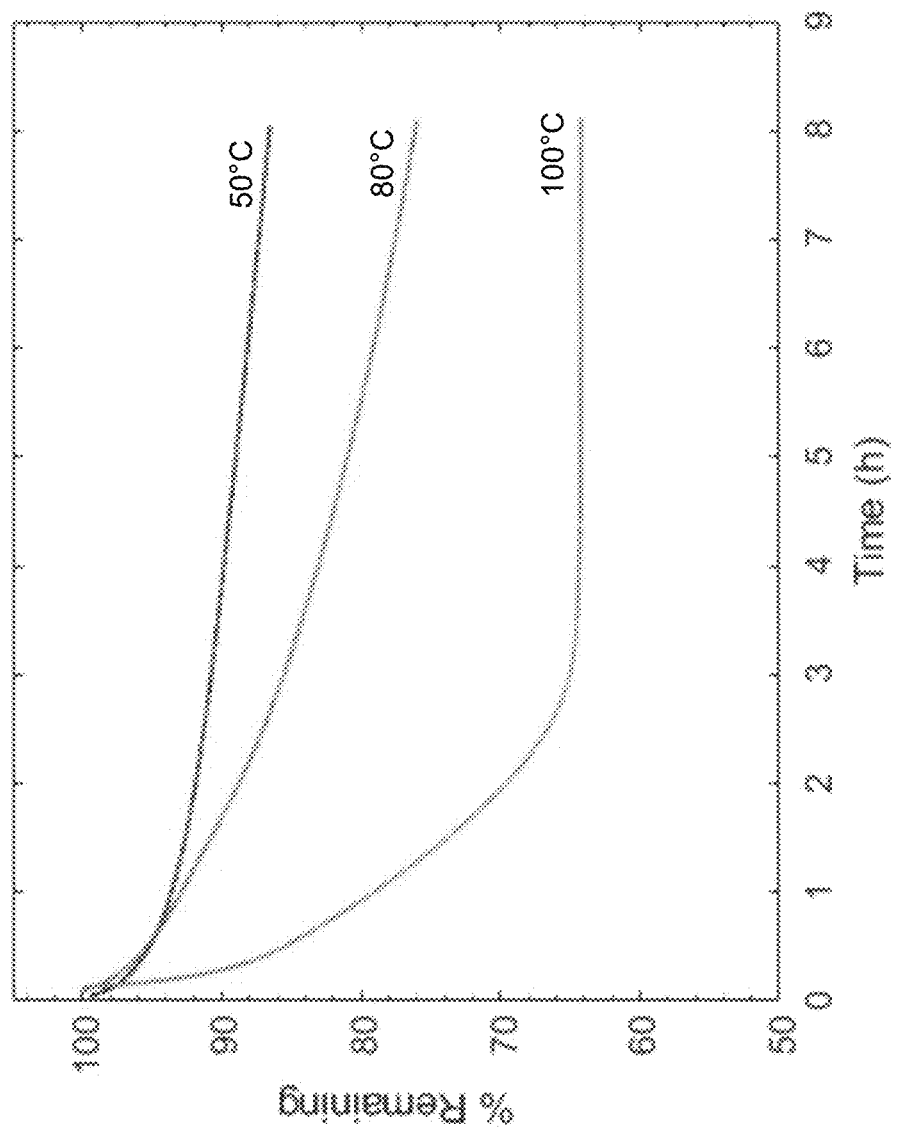
FIG. 7 is a graph showing mass loss (as a percentage (%) mass remaining versus time in hours (h)) from three thermogravimetric analysis (TGA) samples of syntactic foams prepared using an exemplary ink of the presently disclosed subject matter, i.e., Formula I, run at 50 degrees Celsius (° C.), 80° C., or 100° C. For these samples, 40% mass loss (i.e., 60% remaining) indicates that all of the solvent is evaporated.

As the initial TGA tests had been run using relatively small sample sizes, an additional drying test was manually performed on rectangular samples of varying heights in order to quantify the effect of print thickness on solvent outgassing efficiency. 80° C. was selected as the drying temperature for this test as the outgassing behavior observed during the previous DSC experiments appeared relatively gentle while remaining efficient. Four samples were used in this test, each with a 15 mm×15 mm footprint and heights varying from 5 mm to 20 mm in 5 mm increments. All samples were printed within approximately 2 hours, and samples printed at the beginning of this period were covered in order to minimize the amount of outgassing From the initial experiments, it was found that the sample held isothermally at 100° C. had all solvent evaporated within an 8-hour period. The sample held at 80° C. had approximately half of its contained solvent evaporated in the same time, while the sample held at 50° C. had approximately a third of the solvent evaporated. These results can be seen in FIG. 7.

Figure 8:
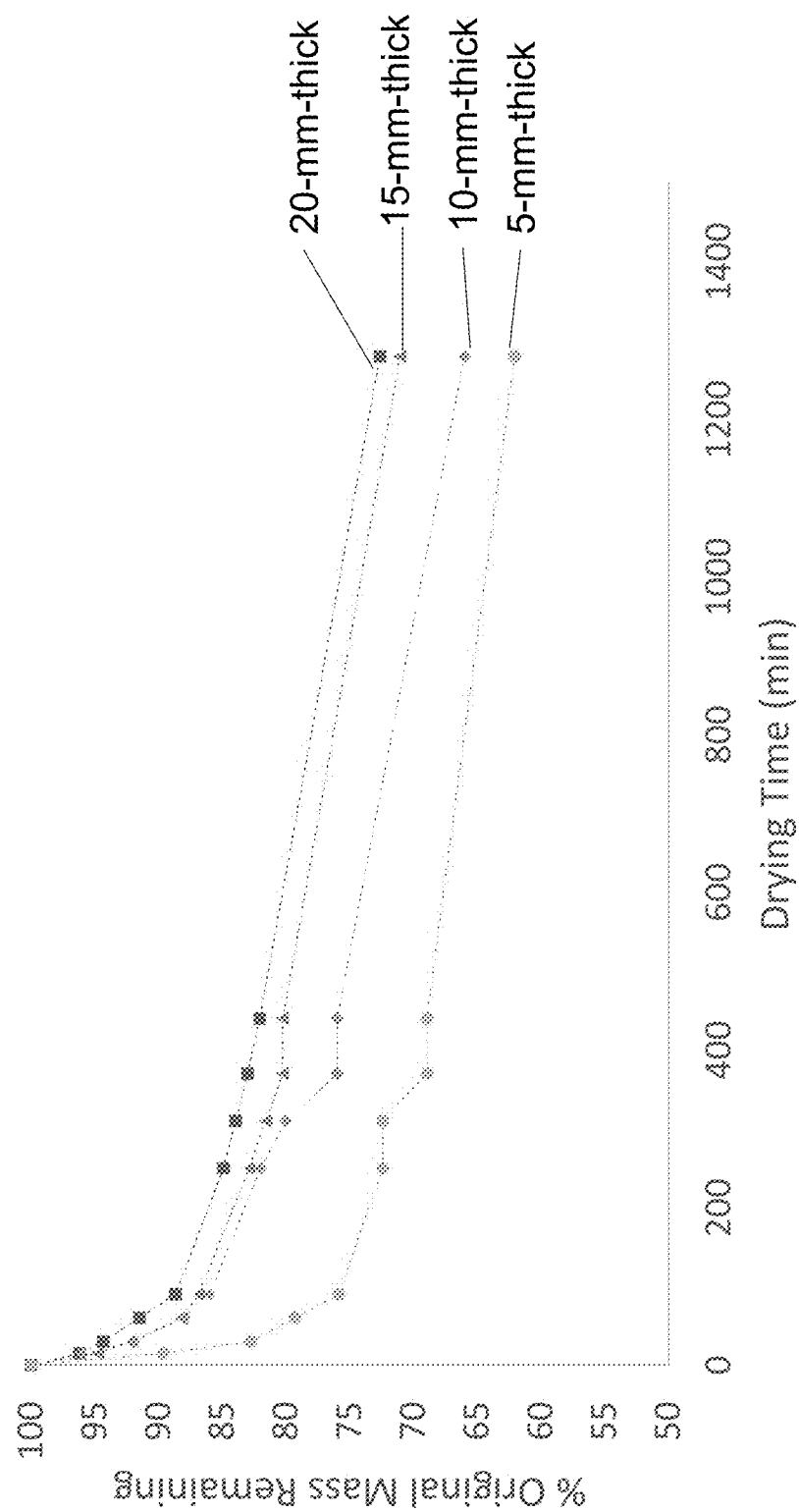
FIG. 8 is a graph showing mass loss (presented as a percentage (%) original mass remaining) versus drying time (in minutes (min)) at 80 degrees Celsius (° C.) for four rectangular uncured syntactic foam samples prepared from an exemplary ink of the presently disclosed subject matter, i.e., Formula I, and having varying height (5 millimeters (mm) (data in circles), 10 mm (data in diamonds), 15 mm (data in triangles), or 20 mm (data in squares)).

The subsequent larger-scale drying experiment revealed the effect of sample thickness within the solvent evaporation process. Demonstrated in FIG. 8, as samples increased in thickness, rate of solvent evaporation noticeably slowed. At the end of the full 21-hour recording period, the sample of 5 mm height had experienced a mass loss of approximately 40%, indicating that all solvent had successfully outgassed. In contrast, the sample of 20 mm height experienced a mass loss of approximately 25% within the same timeframe, signifying that there was still a substantial amount of solvent left within the matrix. This discrepancy indicated that samples of greater thickness or larger scale could use longer drying prior to curing to avoid warping of print geometry.

An additional full-scale mass loss study was conducted with printed samples. The samples were two cubes with side lengths of 1 cm and 2 cm, respectively. Variance in the cube's size was included in order to examine how increasing sample volume affects pre-curing time for complete solvent evaporation due to the increase in solvent trapped in the bulk.

Figure 9A:
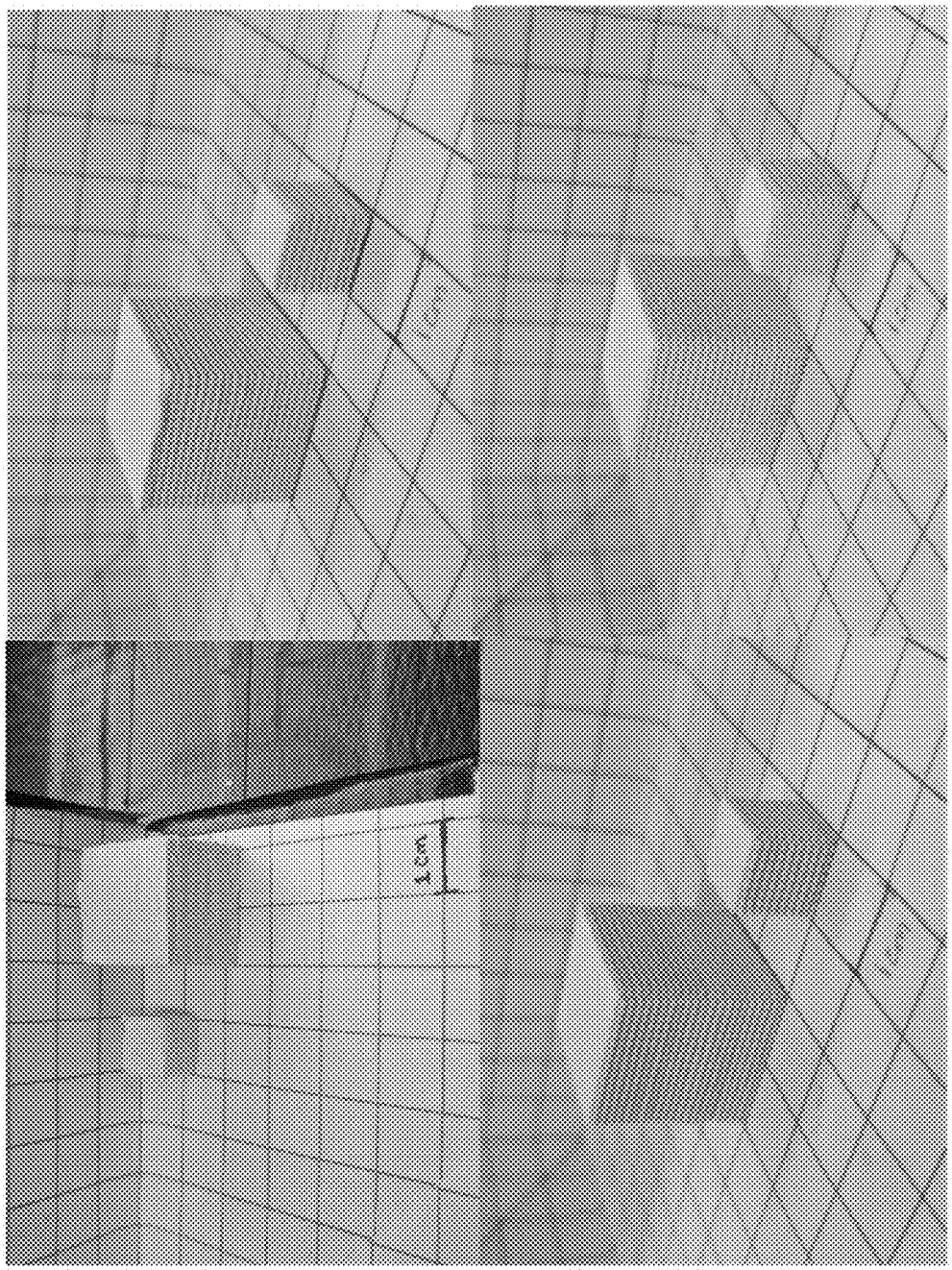
FIG. 9A is a series of photographic images of pairs of 1 centimeter (cm) cube and 2 cm cubes printed using exemplary syntactic foam inks of the presently disclosed subject matter: (top left) Formula I, (top right) Formula II, (bottom left) Formula III, and (bottom right) Formula IV. The scale bars in the bottom of each image represent 1 cm.

For printing, ink (Formula I described in Example 1) was manually loaded into a Fisnar QUANTX™ 8001004 30cc round syringe barrel (I & J Fisnar, Inc., Wayne, New Jersey, United States of America) using a laboratory spatula. A 0.580-mm diameter Fisnar QUANTX™ 8001266 Luer Lock Double Tapered Tip Pink syringe nozzle (I & J Fisnar, Inc., Wayne, New Jersey, United States of America) was then attached. Both cubes were printed using the overlap method (one-layer front-back followed by a layer side-side). The cubes can be seen in FIG. 9A, top left.

Figure 9B:
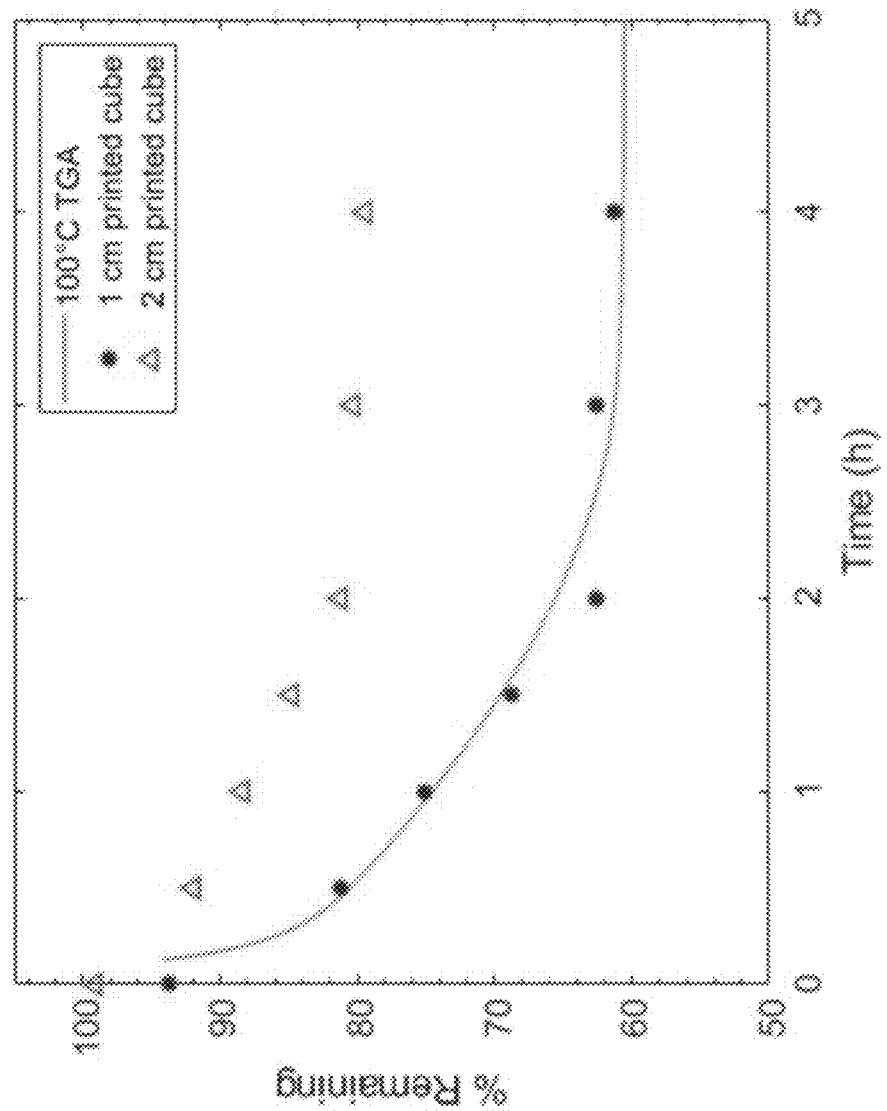
FIG. 9B is a graph showing the mass loss (as a percentage (%) mass remaining versus time in hours (h)) from the 1 centimeter (cm) and 2 cm cubes shown in FIG. 9A at 100 degrees Celsius (° C.). The data for the 1 cm cube is shown in filled circles and the data for the 2 cm cube is shown in unfilled triangles. The solid line shows data from the previous thermogravimetric analysis (TGA) sample heated at 100° C. described in FIG. 7.

Both cubes were weighed immediately after they were printed, and then once more before they were placed in the furnace in order to account for any surface solvent lost in air. The cubes were the placed in a furnace at 100° C. The cubes were re-weighed every 30 minutes for 2 hours, and then every hour for another 2 hours. Mass-loss data over this 4-hour period is shown in FIG. 9B, in comparison with the previous 100° C. TGA data.

Due to the samples' comparable masses, the 1 cm sided cube behaved almost identically to the initial small TGA sample. The 2 cm sided cube behaved similarly, but had a less drastic mass loss rate, which, without being bound to any one theory, is believed due to the further distance for solvent trapped in its bulk to escape.

After completion of the mass loss study, both cube samples were further pre-cured at 100° C. for an additional 3 days in order to ensure all solvent was evaporated. The cubes' external dimensions were then measured along with their masses in order to determine a post-pre-cure (solventless) density for the foam ink material. The 1 cm sided cube had a density of 0.319 g/cc while the 2 cm sided cube had a density of 0.341 g/cc, for an average density of 0.33 g/cc.

Example 3

Glass Transition Temperature Analysis

In order to determine the glass transition temperature (Tg) of the foam prepared from Formula I, an approximately 10 mg sample of cured material was loaded into a TA Instruments Q200 Differential Scanning calorimeter (DSC; TA Instruments, New Castle, Delaware, United States of America). This sample then underwent a Heat-Cool-Heat procedure in which temperature was ramped to 300° C. at 10° C./min and then decreased to room temperature (25° C.) at 10° C./min, before being ramped to 300° C. at 10° C./min once more. The maximum temperature of 300° C. was determined by analysis of TGA data, which demonstrated material degradation of 1% occurring at this point.

Figure 10:
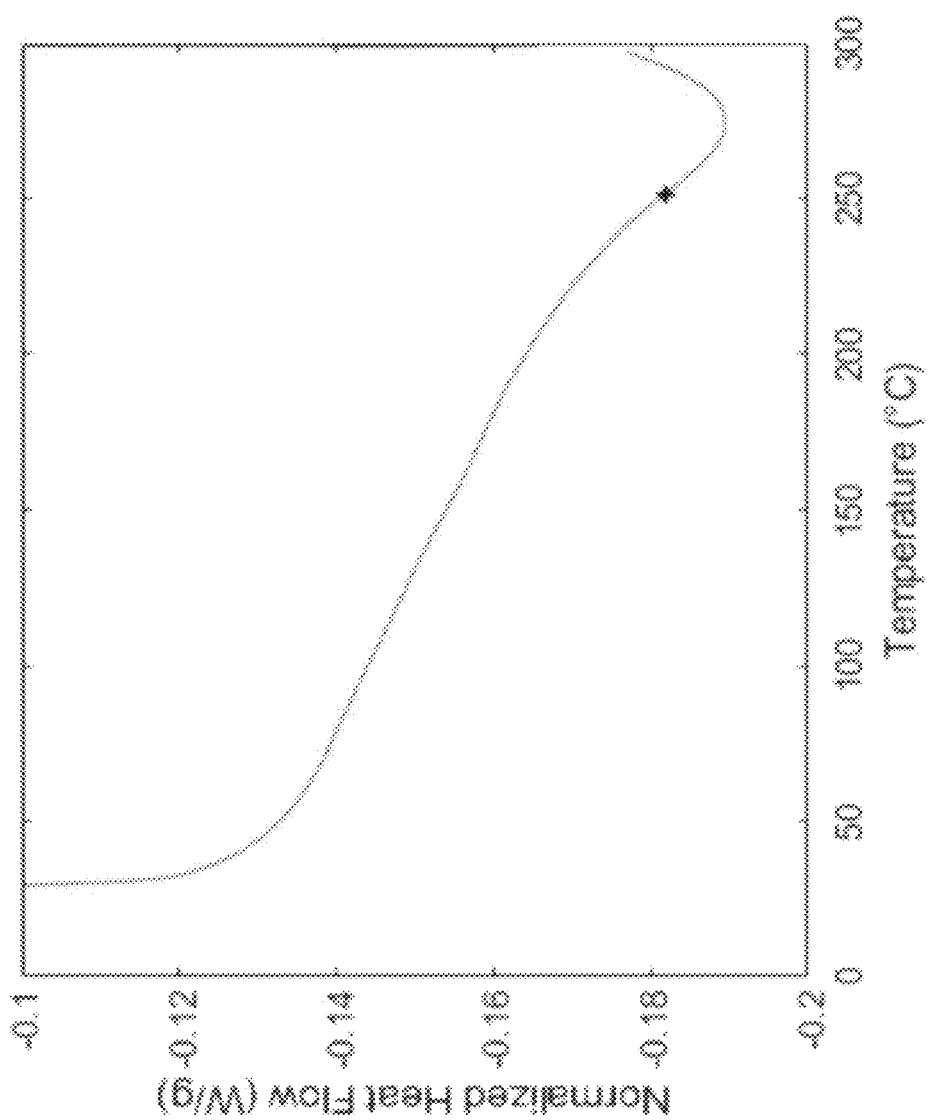
FIG. 10 is a graph showing the glass transition temperature analysis (normalized heat flow (Watts per gram (W/g)) versus temperature (degrees Celsius (° C.)) of a cured syntactic foam prepared using an exemplary syntactic foam ink of the presently disclosed subject matter, referred to herein as Formula III, that is similar to Formula I described for FIG. 1, but which includes a different epoxy resin.

Data collected from the DSC experiment resulted in a plot of normalized heat flow through the material in comparison with temperature at any given point. From this, the Tg point was identified as 250° C. as seen in FIG. 10.

Example 4

Pyrolysis

Figure 11A:
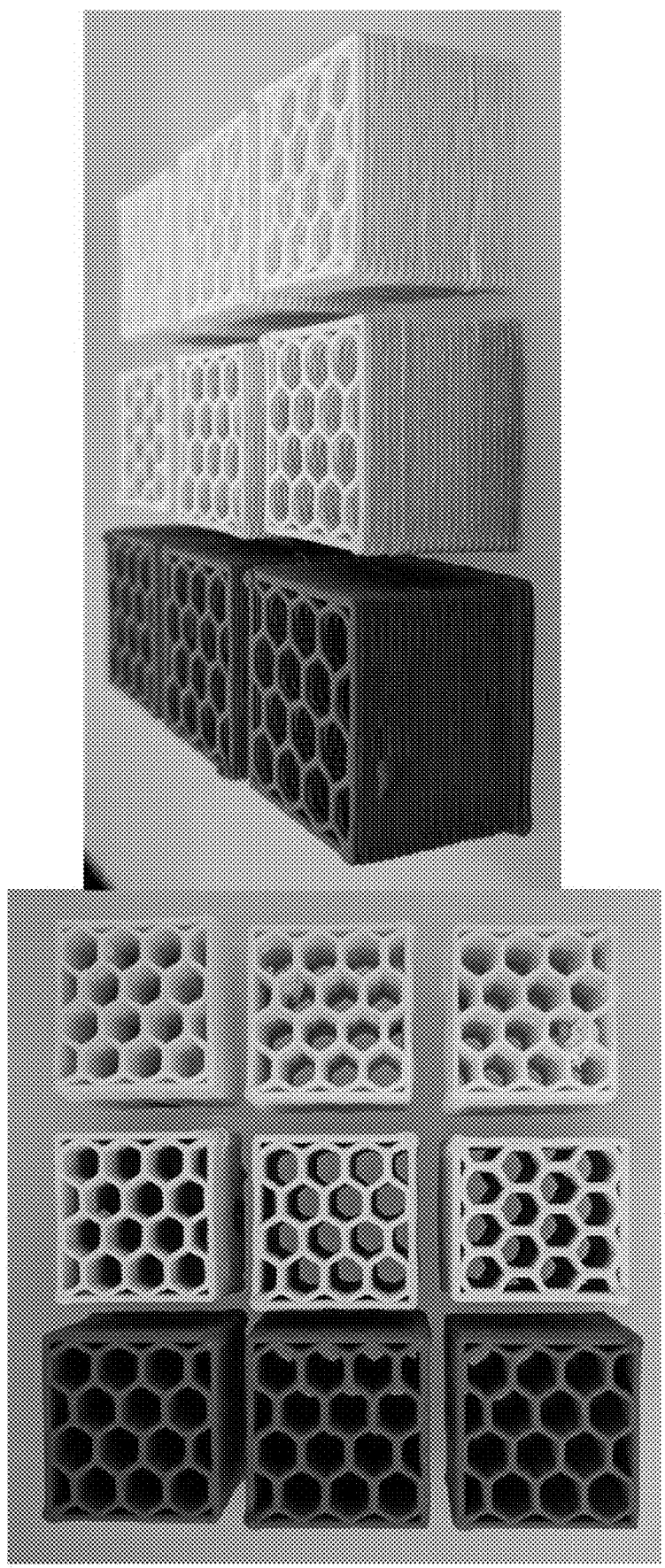
FIG. 11A is a pair of photographic images of (left) a top view and (right) a partial side view of nine printed syntactic foam honeycomb samples prepared from an exemplary syntactic foam ink of the presently disclosed subject matter, i.e. Formula I, which were used to study the effects of pyrolyosis. In each image, the three samples on the left were fully cured, but not pyrolyzed; the middle three samples were fully cured and pyrolyzed at 800 degrees Celsius (° C.); and the three samples on the right were fully cured and pyrolyzed at 1000° C.

Following study of the post-cured properties for foam Formula I, pyrolysis was investigated as a mechanism for decreasing density even further. Nine identical honeycomb samples were printed, each measuring 20 mm×20 mm×25 mm with 6 mm hexagonal cell diameters. The height, length, and width of each honeycomb sample was measured using calipers and the samples were weighed. Initial volume and density value were determined. The data is shown in Table 2, below. The honeycombs were then pre-cured for 3 days before undergoing a full curing cycle. Upon being fully cured, three honeycombs were set aside as a control group. The remaining honeycombs then pyrolized. Three honeycombs underwent pyrolization in a laboratory furnace at 800° C. for two hours, and three honeycombs underwent pyrolization in a laboratory furnace at 1000° C. for two hours. All nine honeycombs can be seen in FIG. 11A.

Figure 11B:
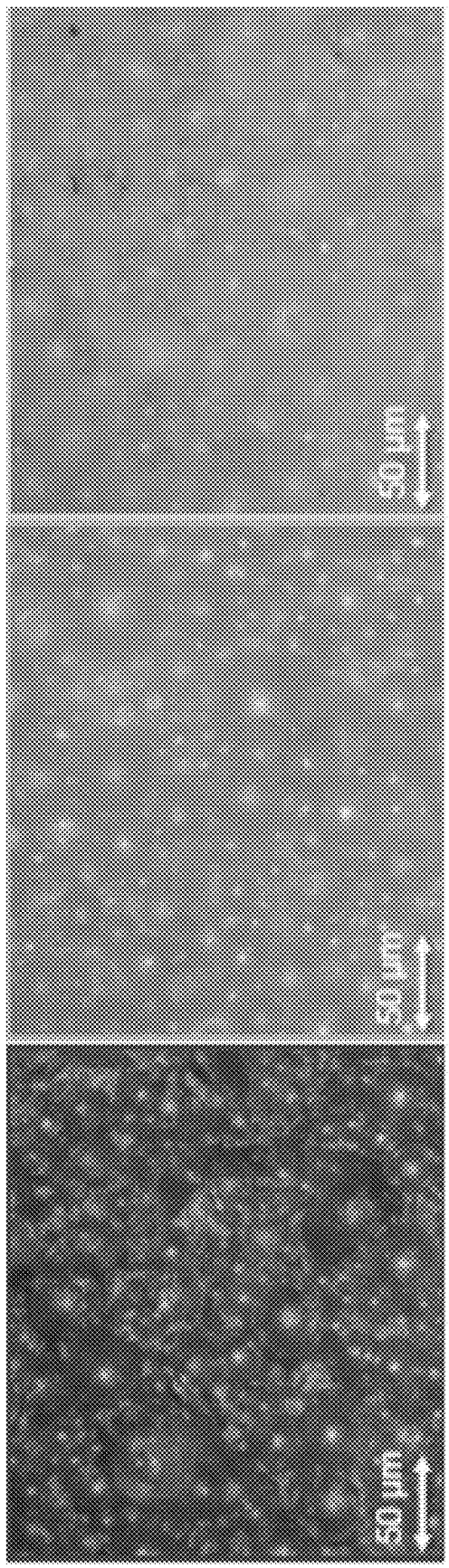
FIG. 11B is series of three micrograph images corresponding to the three treatments described in FIG. 11A. The micrograph on the left is from a syntactic foam sample prepared using an exemplary syntactic foam ink of the presently disclosed subject matter (i.e., Formula I) that was fully cured. The micrograph in the middle is from a printed syntactic foam sample prepared using the same ink and that was fully cured and pyrolyzed at 800 degrees Celsius (° C.). The micrograph on the right is from a syntactic foam sample prepared using the same ink and that was fully cured and pyrolyzed at 1000° C. The scale bar at the bottom left of each micrograph corresponds to 50 microns (μm).

The pyrolyzed honeycombs were then measured and weighed again to determine how the pyrolization process had affected their densities and dimensions. The post-pyrolysis data is provided in Table 3, below. Overall, the honeycombs pyrolized at 800° C. experienced an average density decrease of approximately 33%, while the honeycombs pyrolized at 1000° C. experienced an average density decrease of approximately 29%. Thus, it appears that pyrolysis decreases density by burning off some of the resin. Comparison of the pyrolyzed and cured, but unpyrolyzed samples via microscope indicated that pyrolysis also causes some of the microballoons to melt and rupture. See FIG. 11B. Table 4, below, provides the data for the volume, mass, and density loss resulting from pyrolysis. For comparison, Table 5, below, provides data for the three honeycomb samples that were fully cured, but not pyrolyzed.

TABLE 2

Length, Width, Height, Volume, Mass and Density Data of Honeycomb Structures As-Printed.

| Sample | Length (mm) | Width (mm) | Height (mm) | Volume (cc) | Mass (g) | Density (g/cc) |
|---|---|---|---|---|---|---|
| A | 24.39 | 23.05 | 19.81 | 11.137 | 2.3413 | 0.2102 |
| B | 24.05 | 22.79 | 19.62 | 10.754 | 1.963 | 0.1625 |
| C | 24.47 | 22.9 | 20.11 | 11.269 | 2.3184 | 0.2057 |
| D | 23.54 | 22.32 | 19.34 | 10.161 | 1.8174 | 0.1789 |
| E | 23.24 | 21.95 | 19.45 | 9.922 | 1.8095 | 0.1824 |
| F | 23.93 | 22.61 | 19.66 | 10.637 | 2.3122 | 0.2174 |

TABLE 3

Length, Width, Height, Volume, Mass and Density Data of Honeycomb Structures after Curing and Pyrolysis.

| Sample | Length (mm) | Width (mm) | Height (mm) | Volume (cc) | Mass (g) | Density (g/cc) |
|---|---|---|---|---|---|---|
| A | 21.93 | 20.14 | 18.21 | 8.0428 | 1.1532 | 0.1434 |
| B | 21.74 | 20.73 | 17.78 | 8.0129 | 0.9681 | 0.12982 |
| C | 21.92 | 20.79 | 17.71 | 8.0707 | 1.0875 | 0.13475 |
| D | 21.51 | 20.4 | 17.61 | 7.7273 | 0.998 | 0.1292 |
| E | 21.16 | 19.99 | 17.83 | 7.5419 | 0.9996 | 0.1325 |
| F | 22.02 | 21.01 | 18.13 | 8.3877 | 1.2657 | 0.1509 |

TABLE 4

Volume Loss, Mass Loss and Density Decrease By Comparing Pyrolyzed/Cured Honeycombs to As-Printed Honeycombs.

| Sample | Pyrolization Temperature (° C.) | % Volume Lost | % Mass Lost | % Density Decrease |
|---|---|---|---|---|
| A | 1000 | 27.7828 | 50.7453 | 31.7965 |
| B | 1000 | 25.4870 | 50.6826 | 33.8138 |
| C | 1000 | 28.3804 | 53.0927 | 34.5049 |
| D | 800 | 23.9546 | 45.0864 | 27.7884 |
| E | 800 | 23.9867 | 44.7582 | 27.3262 |
| F | 800 | 21.1477 | 45.2599 | 30.5790 |

TABLE 5

Data for Honeycomb Samples Cured and Not Pyrolyzed.

| Sample | Mass(g) | Length (mm) | Width (mm) | Height (mm) | Volume (cc) | Density (g/cc) |
|---|---|---|---|---|---|---|
| G | 1.8742 | 23.31 | 22.09 | 19.26 | 9.9173 | 0.1890 |
| H | 1.9895 | 23.7 | 22.37 | 19.57 | 10.3754 | 0.1918 |
| I | 2.1522 | 22.85 | 24.1 | 19.69 | 10.8430 | 0.1985 |

Example 5

Ink Variation

After analysis of the original foam formulation (Formula I), three variant formulations were prepared, to study the effects of formula variation on foam properties, such as density. The mixing schedule was kept identical to that used with the original formula, as described in Example 1. The compositions of the variant formulations are listed in Tables 6-8. More particularly, ink Formula II includes the same components as Formula I described in Example 1, but with half the amount of resin and curing agent. Ink Formula III includes a different epoxy resin, i.e., referred to herein as "Epoxy resin B", a liquid bisphenol A based epoxy resin, sold under the tradename EPON™826 (Hexion, Columbus, Ohio, United States of America). Ink Formula IV included fumed silica instead of nanoclay as the viscosity modifying filler.

TABLE 6

Ink Formula II.

| Constituent | Batch mass (g) | Weight Fraction in ink | Weight Fraction after cure |
|---|---|---|---|
| Epoxy resin A EPON ™ 164) | 2.5 | 0.125 | 0.258 |
| DDS | 0.7 | 0.035 | 0.072 |
| Nanoclay | 1 | 0.050 | 0.103 |
| GMBs | 5.5 | 0.276 | 0.567 |
| MEK | 1.5 | 0.075 | 0 |
| Acetone | 1.75 | 0.088 | 0 |
| Camphor | 7 | 0.351 | 0 |

TABLE 7

Ink Formula III.

| Constituent | Batch mass (g) | Weight Fraction in ink | Weight Fraction after cure |
|---|---|---|---|
| Epoxy resin B (EPON ™826) | 5 | 0.207 | 0.360 |
| DDS | 1.4 | 0.058 | 0.101 |
| Nanoclay | 2 | 0.083 | 0.144 |
| GMBs | 5.5 | 0.228 | 0.395 |
| MEK | 1.5 | 0.062 | 0 |
| Acetone | 1.75 | 0.072 | 0 |
| Camphor | 7 | 0.290 | 0 |

TABLE 8

Ink Formula IV.

| Constituent | Batch mass (g) | Weight Fraction in ink | Weight Fraction after cure |
|---|---|---|---|
| Epoxy resin A (EPON ™164) | 5 | 0.207 | 0.360 |
| DDS | 1.4 | 0.058 | 0.101 |
| Fumed Silica | 2 | 0.083 | 0.144 |
| GMBs | 5.5 | 0.228 | 0.395 |
| MEK | 1.5 | 0.062 | 0 |
| Acetone | 1.75 | 0.072 | 0 |
| Camphor | 7 | 0.290 | 0 |

The printability of each of Formulas II-IV was studied. All inks were loaded identically using a 30cc Fisnar QUANTX™ round syringe (I & J Fisnar, Inc., Wayne, New Jersey, United States of America) with vacuum grease applied to the sides of the syringe plunger to dissuade ink drying, and a 20-gauge Fisnar QUANTX™ 0.5" nozzle with a diameter of 0.634 mm. All inks had identical print speeds of 1200 mm/min and were printed in identical straight-line paths.

Two additional variant formulas were prepared to study multifunctionality within the syntactic foam ink. The first multifunctional variant (Formula V) contained graphene (N006-P graphene, Angstrom Materials, Dayton, Ohio, United States of America), while the second (Formula VI) contained hexagonal boron nitride nanoparticles. The compositions of these two ink variations are described in Tables 9 and 10, below.

TABLE 9

Ink Formula V.

| Constituent | Batch mass (g) |
|---|---|
| Epoxy resin A (EPON ™164) | 5 |
| DDS | 1.4 |
| Nanoclay | 0.5 |
| GMBs | 5.5 |
| graphene | 2 |
| MEK | 1.5 |
| Acetone | 1.75 |
| Camphor | 7 |

TABLE 10

Ink Formula VI.

| Constituent | Batch mass (g) |
|---|---|
| Epoxy resin A (EPON ™164) | 5 |
| DDS | 1.4 |
| Nanoclay | 1 |
| GMBs | 5.5 |
| Hexagonal boron nitride (hBN) | 5 |
| MEK | 1.5 |
| Acetone | 1.75 |
| Camphor | 7 |

These multifunctional inks were then used to manufacture a series of thermal conductivity samples. Three sets of two flat rectangular samples were printed with the original foam ink (Formula I), graphene-containing ink (Formula V), and boron nitride nanoparticle-containing ink (Formula VI) each comprising a single pair. All samples were printed with original dimensions of approximately 20×20 mm sides and 5 mm thickness. Following fully curing, the top and bottom surfaces of all samples were machined flat using a variable speed mill. After machining, all samples possessed thicknesses between approximately 3.5 and 5 mm. Thermal conductivity of the prepared samples was then determined following the absolute measurement technique for bulk materials previously described in the literature. See Zhao et al., Journal of Electronic Packaging, 138(4):040802 (2016). Five trials were performed for each pair of samples.

It was found that all three of Formulas II-IV ultimately printed acceptably, with printing behavior nearly identical to that of Formula I, with no changes to printing nozzle or speed. The Epoxy resin B/DDS Foam ink (Formula III) printed at a moderate pressure of approximately 45 psi and exhibited good resolution flow when an additional 0.5 g of acetone was added, as the as-mixed formula was too thick to effectively print. The ink with fumed silica (Formula IV) also printed with decent resolution at approximately 35 psi but required no extra solvent to be added, as it was already thin enough to print as-mixed. Formula II (which had half the resin of Formula I) initially printed with good resolution and had an extremely thin consistency, printing at very low pressure of approximately 20 psi with no additional solvent but exhibited shrinking behavior. Upon being printed, the beads would shrink due to the ink's high amount of evaporating solvent relative to resin and fillers. In some instances, this led to undesirable gaps forming between beads in a print. One possible approach for avoiding this phenomenon is believed to be the use of higher pressure during printing, so that the bead initially prints too wide, but shrinks down to a desired size.

In contrast to Formulas II-IV, the multifunctional foam inks (Formulas V and VI) were printed with approximately 10-20% increases in pressure to provide clean extrusion at the same print speed and nozzle diameter as the other formulas due to having greater thickness.

Each of Formulas II-IV was used to print two cube samples of the same dimensions as was done for the original formulation; i.e. one 1 cm-sided cube and one 2 cm-sided cube. See FIG. 9A, top right, bottom left, and bottom right. All of these cube samples were pre-cured for 3 days before being fully cured. After pre-curing, the Formula II and Formula III cubes were found to have retained their shapes very closely, but the Formula IV cube was observed to have ballooned noticeably beyond its original footprint. Mass and dimensions of each of the cubes were measured after pre-curing and again after full curing. See Tables 11 and 12, below. It was found that the Formula III and Formula IV cubes had fully cured densities comparable to cubes prepared using original Formula I, while the Formula II cubes had a fully cured density approximately 20% lower than that of the original foam.

TABLE 11

Dimensions of Formula I-IV Cubes Before and After Curing.

| Formula | Theoretical Side Length (mm) | Pre-cure Length (mm) | Pre-cure Width (mm) | Pre-cure Height (mm) | Post-cure Length (mm) | Post-cure Width (mm) | Post-cure Height (mm) |
|---|---|---|---|---|---|---|---|
| I | 10 | 11.38 | 11.69 | 10.86 | 10.92 | 11.07 | 10.56 |
| I | 20 | 21.91 | 22.4 | 21.19 | 21.5 | 20.88 | 21.04 |
| II | 10 | 9.88 | 10.41 | 10.05 | 9.92 | 10.44 | 10.01 |
| II | 20 | 20.12 | 20.74 | 20.71 | 20.09 | 20.65 | 20.62 |
| III | 10 | 9.53 | 10.08 | 9.81 | 9.6 | 10.08 | 9.77 |
| III | 20 | 19.79 | 20.33 | 20.66 | 19.62 | 20.03 | 20.54 |
| IV | 10 | 11.88 | 11.28 | 10.15 | 11.32 | 11.89 | 10.1 |
| IV | 20 | 23.14 | 23.14 | 20.54 | 22.66 | 23.42 | 20.45 |

TABLE 12

Volume, Mass and Density of Formula I-IV Cubes Before and After Curing.

| Formula | Theoretical Side Length (mm) | Pre-cure Volume (cc) | Pre-cure Mass (g) | Pre-cure Density (g/cc) | Post-cure Volume (cc) | Post-cure Mass (g) | Post-cure Density (g/cc) |
|---|---|---|---|---|---|---|---|
| I | 10 | 1.445 | 0.461 | 0.319 | 1.277 | 0.457 | 0.358 |
| I | 20 | 10.400 | 3.541 | 0.341 | 9.445 | 3.440 | 0.364 |
| II | 10 | 1.034 | 0.281 | 0.272 | 1.037 | 0.279 | 0.269 |
| II | 20 | 8.642 | 2.395 | 0.277 | 8.554 | 2.364 | 0.276 |
| III | 10 | 0.942 | 0.357 | 0.378 | 0.945 | 0.344 | 0.364 |
| III | 20 | 8.312 | 3.212 | 0.386 | 8.072 | 3.067 | 0.380 |
| IV | 10 | 1.360 | 0.445 | 0.327 | 1.359 | 0.444 | 0.326 |
| IV | 20 | 10.476 | 3.501 | 0.334 | 10.857 | 3.487 | 0.321 |

Figure 12A:
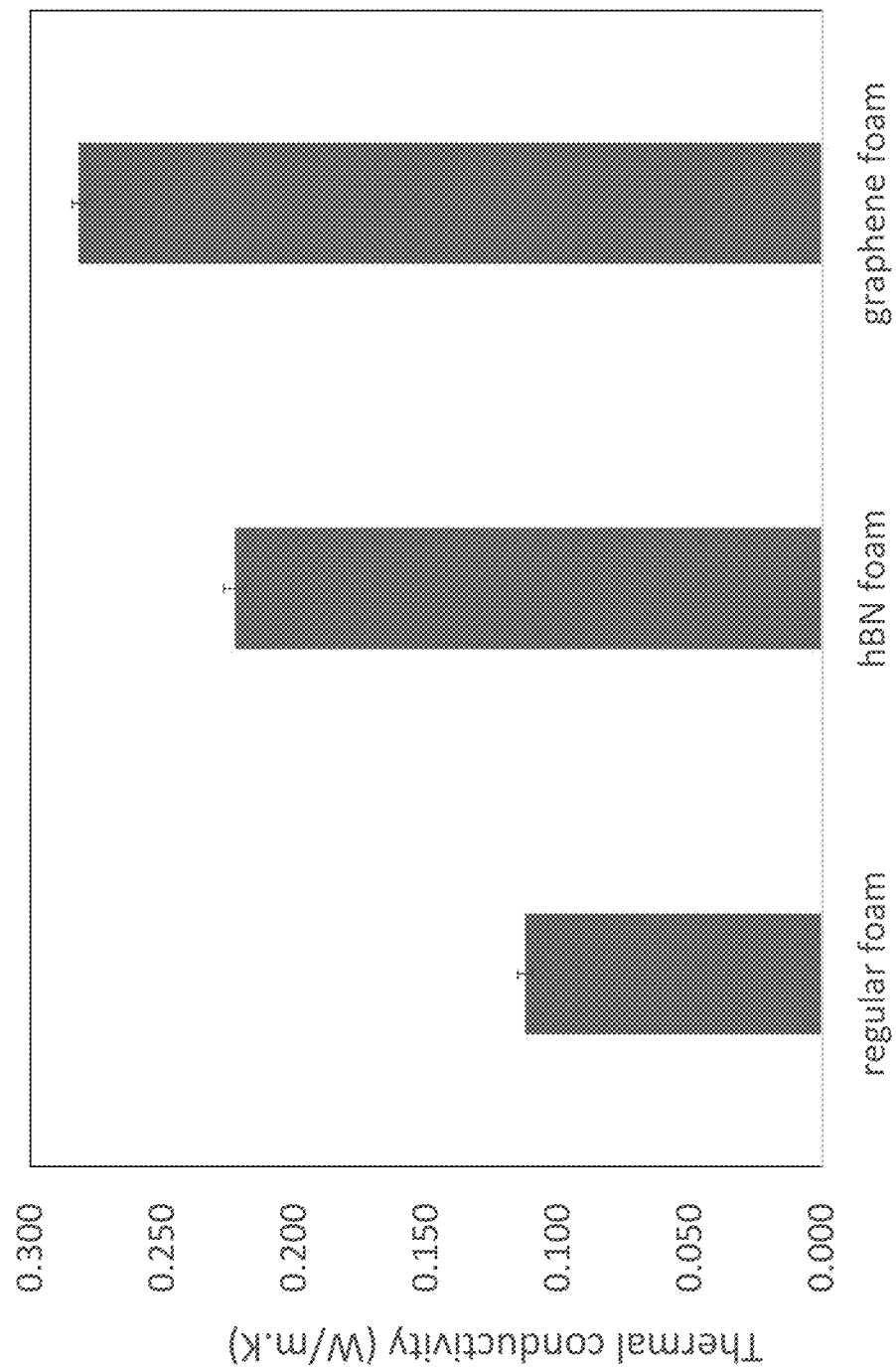
FIG. 12A is a graph showing the thermal conductivity values (Watts per meter-Kelvin (W/mK)) for: a foam prepared from an exemplary syntactic foam ink comprising an epoxy resin, an amine curing agent, glass microballoons, and nanoclay, i.e., Formula I (regular foam); a foam prepared from an ink also including boron nitride (hBN foam), and a foam prepared from an ink also including graphene (graphene). Five samples of each foam were tested and the average shown.
Figure 12B:
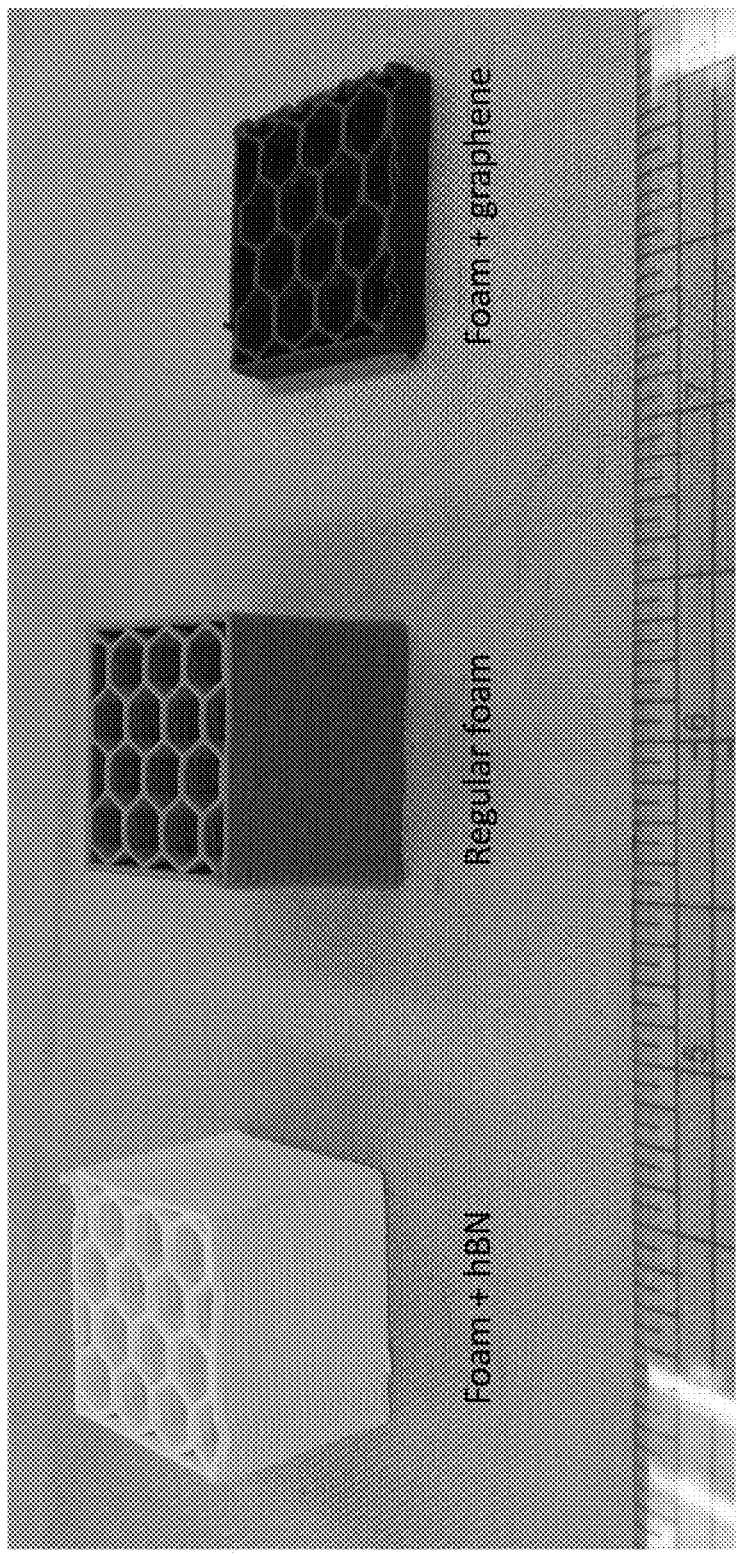
FIG. 12B is a photographic image showing syntactic foam honeycomb structures printed with different ink formulas of the presently disclosed subject matter: (left) a foam including hexagonal boron nitride microparticles (foam+hBN; printed from Formula VI; (middle) a foam without any thermal conductivity modifying filler (regular foam, printed from Formula I); and (right) a foam including graphene (foam+graphene, printed from Formula V).

Samples prepared using Formula V and VI demonstrated increases in thermal conductivity compared to samples prepared from Formula I. See FIG. 12A. While the sample prepared from Formula I exhibited an average thermal conductivity value of about 0.11 Watts per meter-Kelvin (W/mK), the samples prepared with the boron nitride and carbon fiber exhibited average values of about 0.22 W/mK and 0.28 W/mK. These results correspond to increases in thermal conductivity of 100% and 150%. FIG. 12B shows photographic images of objects printed using Formulas V and VI as compared to Formula I.

Example 6

Dynamic Mechanical Analysis

Dynamic mechanical analysis (DMA) was performed in the three-point bending condition at a constant oscillation frequency of 1 Hz using a Discovery HR-2 rheometer (TA Instruments, New Castle, Delaware, United States of America). Testing was performed both on a sample prepared using the original foam ink (Formula I), as well as on a sample prepared using the variant ink formula containing the Epoxy resin B (Formula III). For each material, four flat specimens were printed with dimensions of 40 mm×8 mm×2 mm. Following printing and full curing, all samples were polished by hand using 400 grit silica grinding paper to achieve smooth edges and surfaces. After polishing, all specimens possessed thicknesses between approximately 1.6 to 2.1 mm and lengths between approximately 37 and 39 mm. Testing was performed using a span of 30 mm, resulting in a span-to-thickness ratio greater than 10:1 as well as at least 10% length overhang on either side of the span as specified by ASTM D7028. During testing, samples were heated from ambient (about 29° C.) to 300° C. with a ramp rate of 5° C./min.

Figure 13:
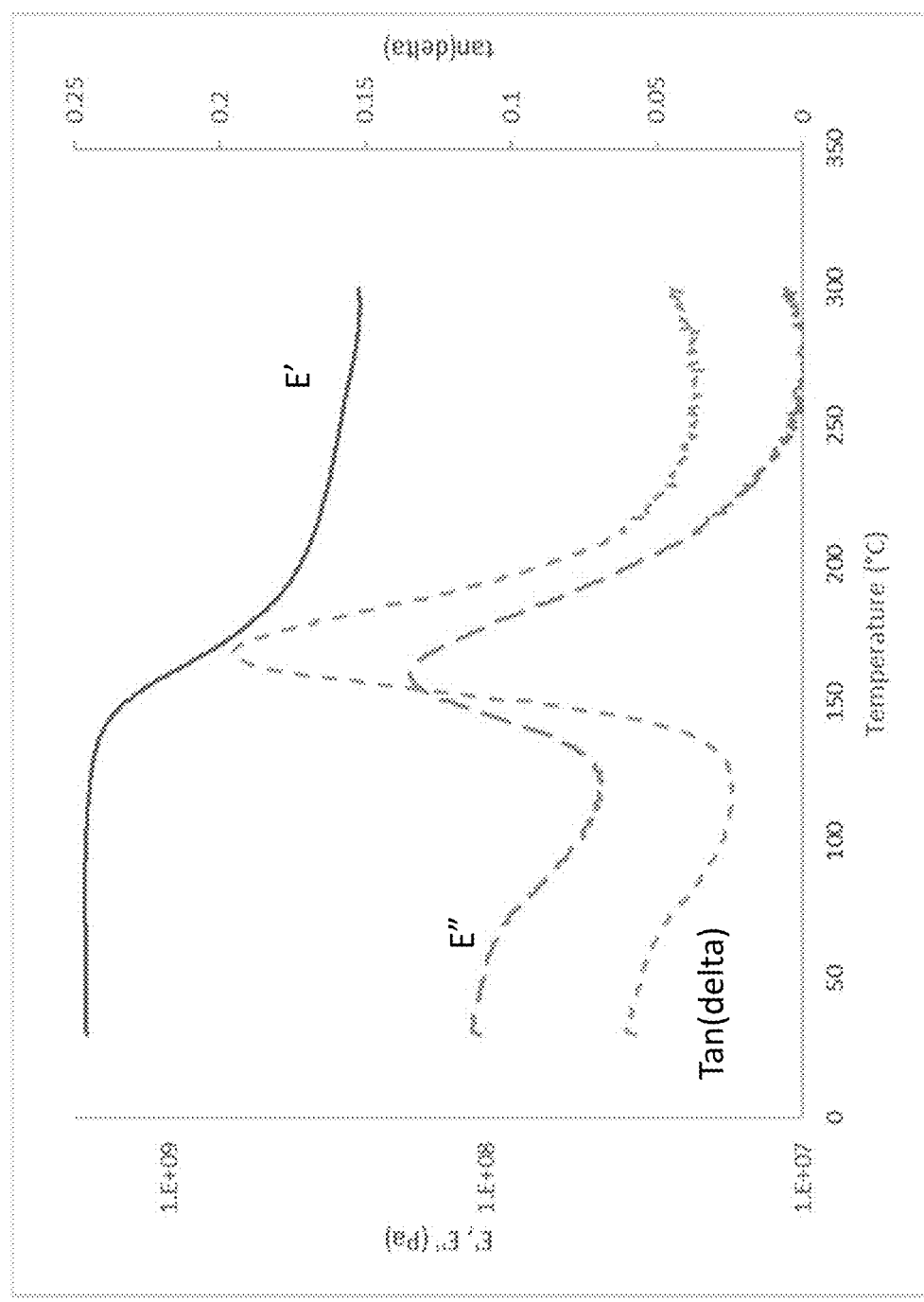
FIG. 13 is a graph showing the dynamic mechanical analysis for a foam prepared from an exemplary syntactic foam ink formula of the presently disclosed subject matter referred to as Formula III, showing changes in storage modulus (E', solid line), loss modulus (E", dashed line) (both in Pascals (Pa)) and tan (delta) (dotted line) with respect to temperature (in degrees Celsius (° C.)) increase.
Figure 14:
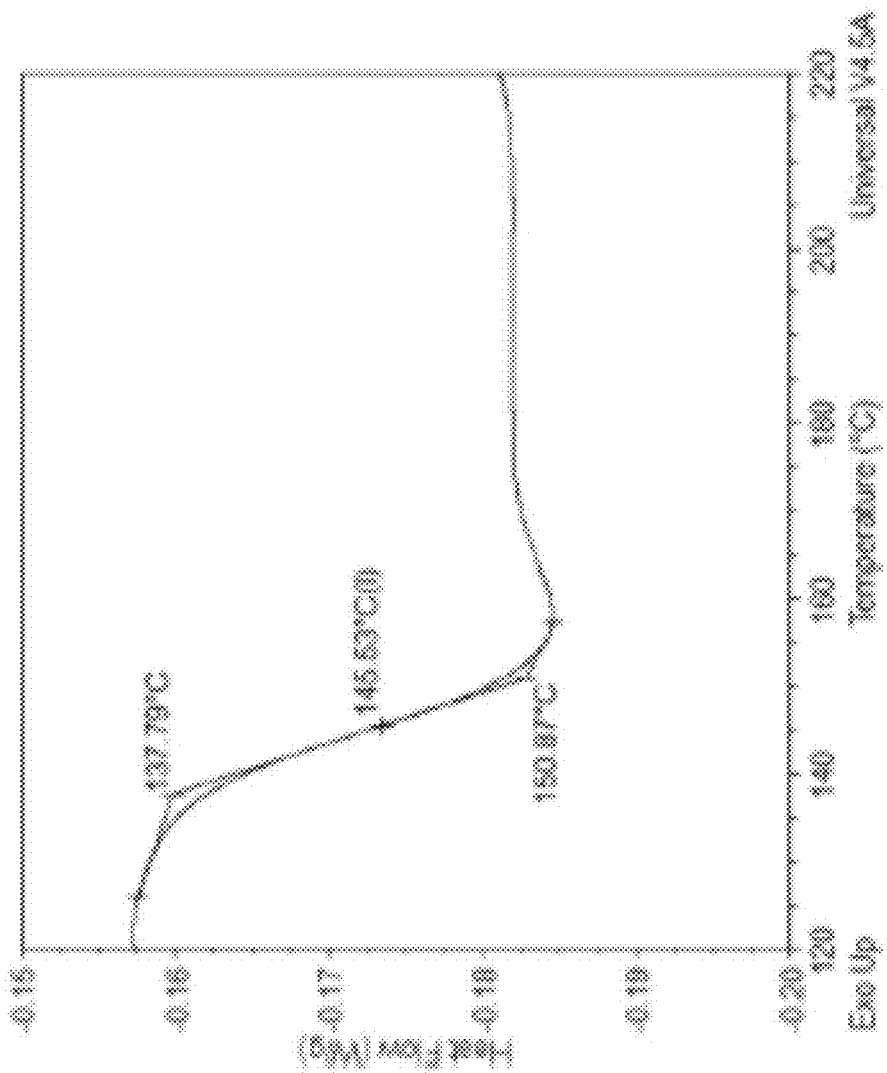
FIG. 14 is a graph showing the glass transition temperature analysis (normalized heat flow (Watts per gram (W/g)) versus temperature (degrees Celsius (° C.)) of a cured syntactic foam prepared using the same syntactic foam ink, i.e., Formula III, used for the foam described for FIG. 13. The foam's glass transition temperature (Tg) is marked by the "+".

Data from the DMA testing displayed relatively good behavior for the sample using Epoxy Resin B (Formula III) with respect to Tg identification, as the data demonstrated clearly defined peaks within the loss modulus and tan delta, as well as a definite change in slope for the storage modulus. See FIG. 13. The Tg posited by this method is about 150° C., which is in good agreement with the 145° C. Tg value determined for this material via DSC. See FIG. 14. However, the behavior of the storage modulus following the occurrence of the Tg is non-ideal as it continues to gradually slope downwards rather than continue with a constant value as would be expected. Nevertheless, this is not regarded as critical as the transition point is still well-defined.

Example 7

Mechanical Analysis

Compression testing was performed on all nine honeycombs involved in the pyrolysis study described in Example 4 using an electromechanical load frame (Model 45, MTS Systems Corporation, Eden Prairie, Minnesota, United States of America) with a 10 kN lad cell and crosshead rate of 0.01 mm/s. All tests were performed at ambient temperature conditions (about 25° C.). All tests were performed with samples oriented in the z-axial direction such that the bottom printed face was set against the bottom platen. Top surfaces of the samples that originally contained print features were manually ground down with sandpaper prior to testing to allow for the surface to rest flush against the top platen.

Nine honeycomb specimens of varying geometries were subsequently printed as well as three fully dense cubes. One set of three honeycombs contained footprints of approximately 25 mm×25 mm with 20 mm height and 6 mm cell size, a second set of three honeycombs contained footprints of approximately 25 mm×25 mm with 20 mm height and 4 mm cell size, and a third set contained footprints of approximately 38 mm×55 mm with 15 mm height and 14 mm cell size. Each of the fully dense cubes were identical with 15 mm×15 mm footprints and 15 mm height. All samples were fully dried and cured and subsequently subjected to compression analysis testing using the same procedure as for the pyrolysis study specimens. While the honeycomb samples were also tested at an ambient temperature of about 25° C., the cube samples were tested at a later date with an ambient temperature of about 21° C. Top surfaces of the honeycomb samples that originally contained print features were manually ground down with sandpaper prior to testing to allow for the surface to rest flush against the top platen. All sides of the fully dense cube samples were milled to remove all residual print features prior to testing. After milling, the dimensions and weight of each cube sample were also recorded in order to determine an accurate bulk density for the cured syntactic foam ink.

Additionally three flexure bars of approximate dimensions 40×10×3 mm were printed, dried, and cured. These bars were then tested in three-point flexure on the same MTS electromechanical load frame using a 10 kN load cell and crosshead rate of 0.6 mm/min. Tests were conducted at ambient temperature (about 21° C.). A span of 32 mm was used for all tested specimens. Samples were oriented such that the top surface containing print features was loaded in tension and the bottom face was loaded in compression. No surface grinding or polishing was performed prior to testing.

Figure 15:
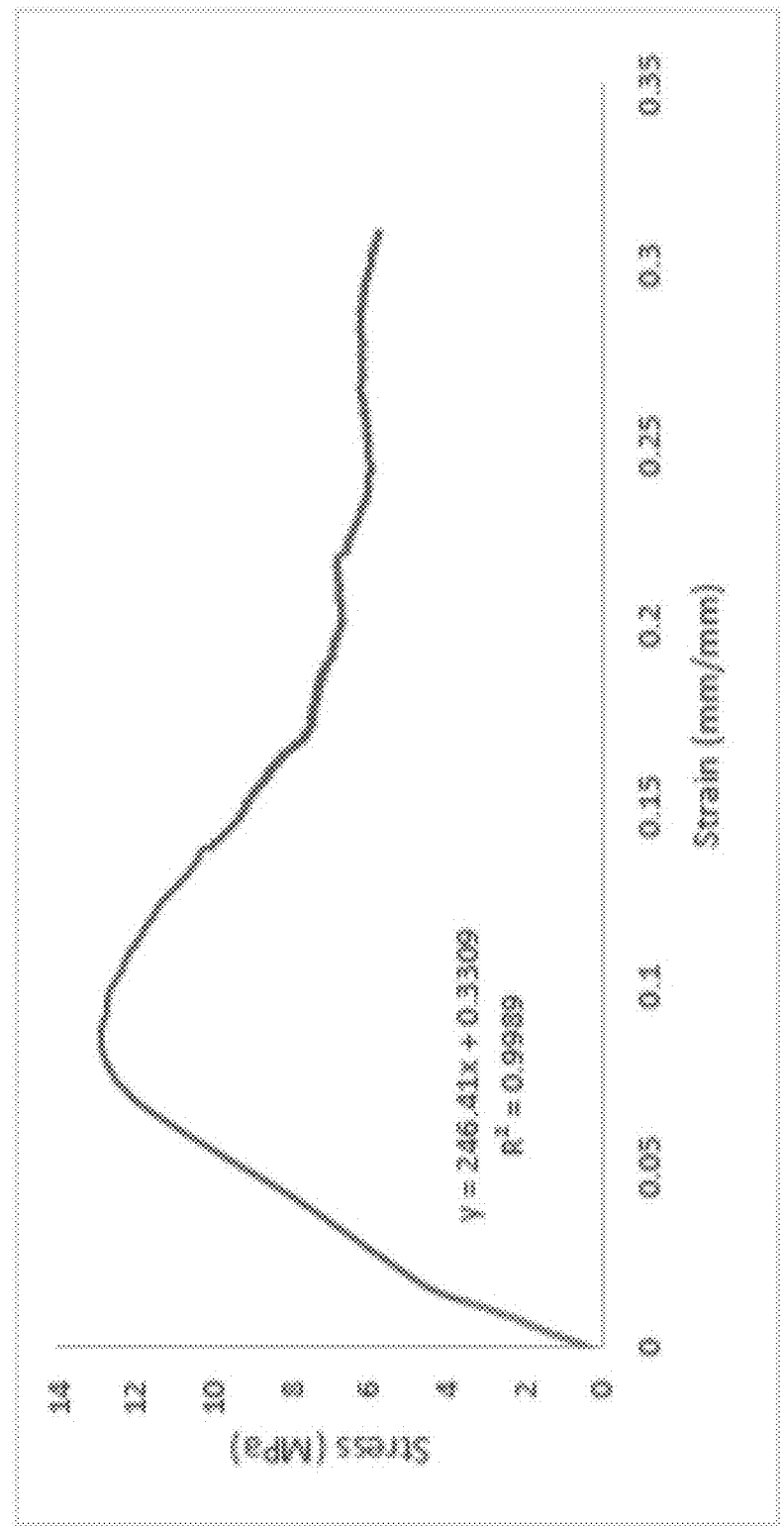
FIG. 15 is a graph showing a compressive stress-strain curve (megapascals (MPa) versus millimeter per millimeter (mm/mm)) for a cured, fully dense cube printed with an exemplary syntactic foam ink of the presently disclosed subject matter, i.e., Formula I.

FIG. 15 provides a sample plot of the compressive stress-strain behavior for the original foam ink formulation (Formula I). This particular curve demonstrates compression of a fully dense cube sample but is representative of the general trend observed in compression of this material. Generally, the material exhibits a relatively constant section of linear elastic loading before reaching the yield point, after which a slow, gradual process of plastic deformation and failure ultimately occurs.

Figure 16:
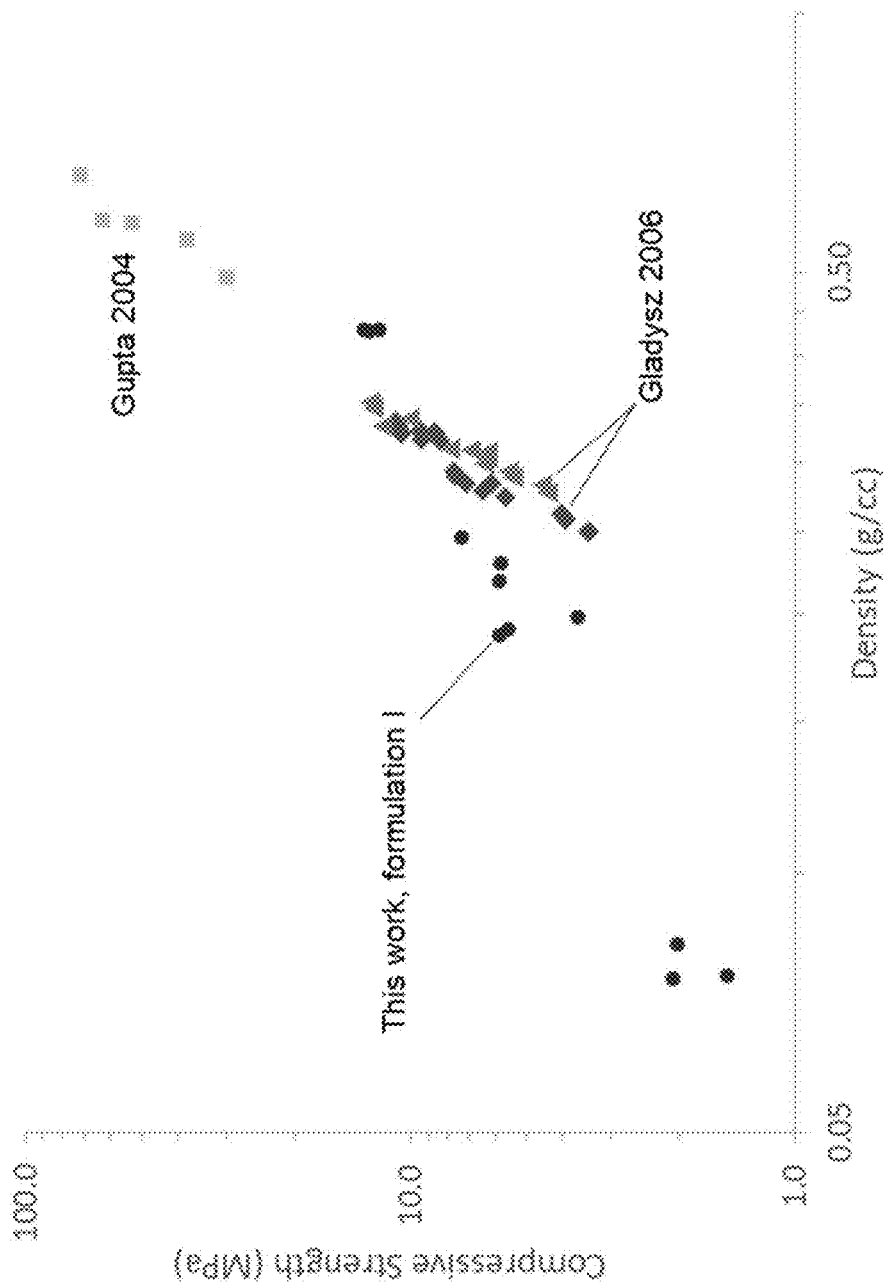
FIG. 16 is a graph showing the compressive strength (in megapascals (MPa)) versus density (in grams per cubic centimeter (g/cc)) of fully cured syntactic foam samples prepared from an exemplary syntactic foam ink of the presently disclosed subject matter, i.e., Formula I (data in circles). For comparison, data is also provided for previously described syntactic foams from Gladysz et al. (Journal of Materials Science, 41(13):4085-4092 (2006), i.e., Gladysz 2006) and Gupta and Nagorny (Journal of Applied Polymer Science, 102(2), 1254-1261 (2005), i.e., Gupta 2004 (data in squares)). The foams from Gladysz 2006 contained carbon microballoons (CMB) of two different densities, 0.138 g/cc (data in diamonds) and 0.179 g/cc (data in triangles).
Figure 17:
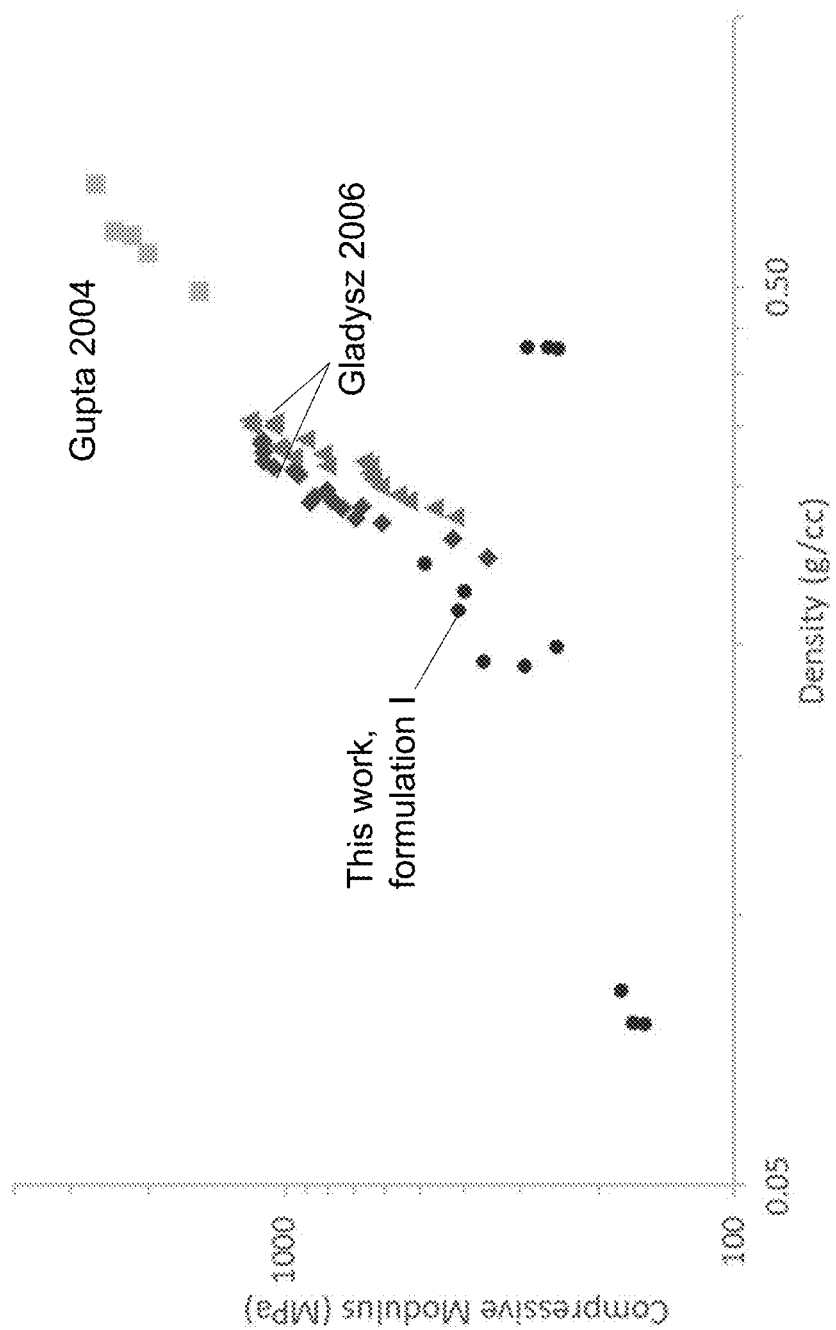
FIG. 17 is a graph showing the compressive modulus (in megapascals (MPa)) versus density (in grams per cubic centimeter (g/cc)) of syntactic foam samples prepared using an exemplary syntactic foam ink of the presently disclosed subject matter, i.e., Formula I (data in circles). For comparison, data is also provided for previously described syntactic foams from Gladysz et al. (Journal of Materials Science, 41(13):4085-4092 (2006), i.e., Gladysz 2006) and Gupta and Nagorny (Journal of Applied Polymer Science, 102(2), 1254-1261 (2005), i.e., Gupta 2004 (data in squares)). The foams from Gladysz 2006 contained carbon microballoons (CMB) of two different densities, 0.138 g/cc (data in diamonds) and 0.179 g/cc (data in triangles).

FIG. 16 demonstrates the compressive strength-to-density trend for the original foam ink formula (Formula I) plotted against comparable examples from existing literature. Within this plot, it is clear that the ink is able to be used in tandem with architected geometry principles to create specimens with lower overall densities than any syntactic foam previously described in the literature. Also, products of this ink possess a much shallower relationship between density and strength, such that they remain stronger at low densities compared to prior syntactic foams. These observations are corroborated by FIG. 17, which depicts corresponding comparisons between elastic modulus and density.

Figure 18:
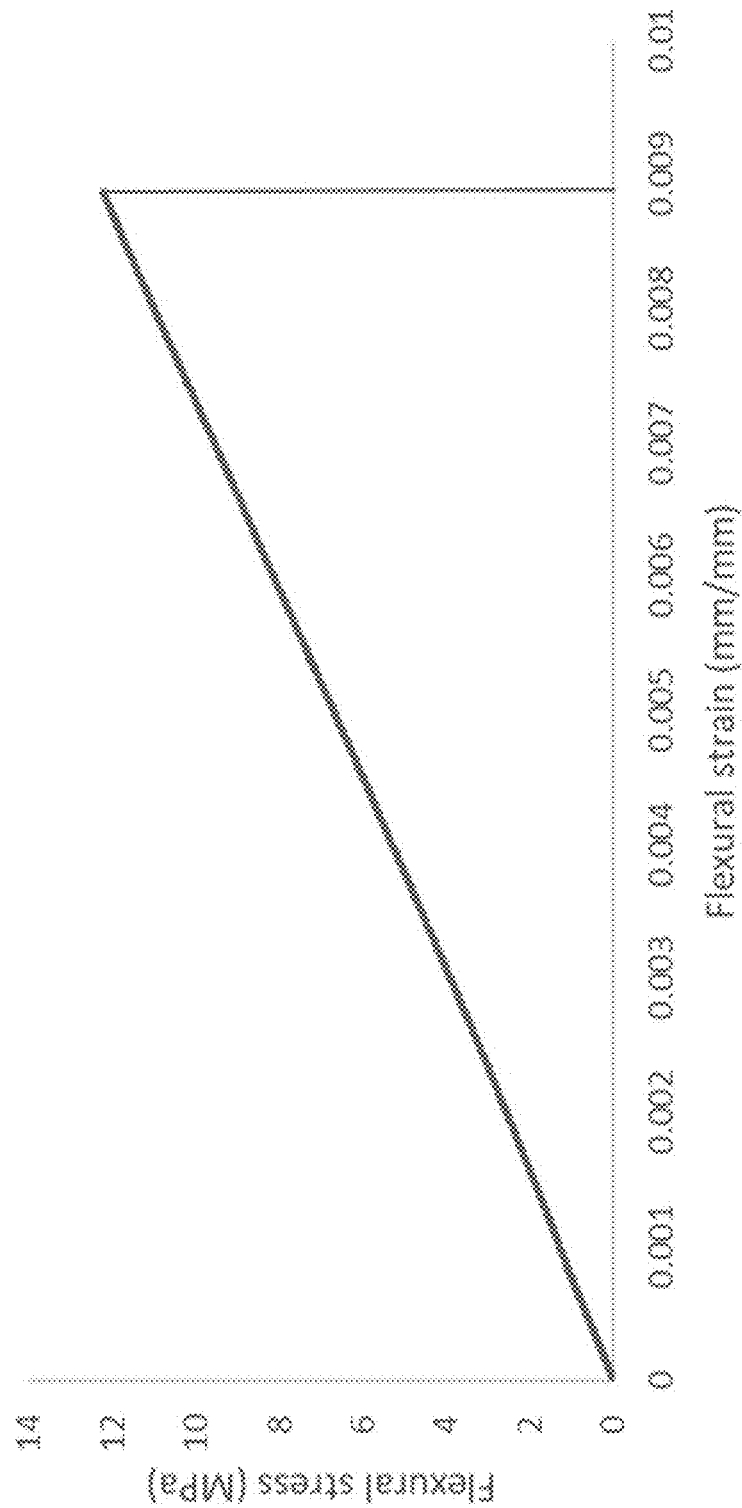
FIG. 18 is a graph showing the flexural stress-strain curve (megapascals (MPa) versus millimeter (mm) for a syntactic foam prepared using an exemplary syntactic foam ink of the presently disclosed subject matter, i.e., Formula I.

FIG. 18 provides a sample plot of flexural stress-strain behavior for the products of Formula I. The material exhibits a constant section of linear elastic loading before reaching the yield point, at which complete and catastrophic failure occurs. All flexural samples exhibited failure at approximately 0.9% strain and failure was observed to generally initiate on the tensile side of the specimen.

Figure 19:
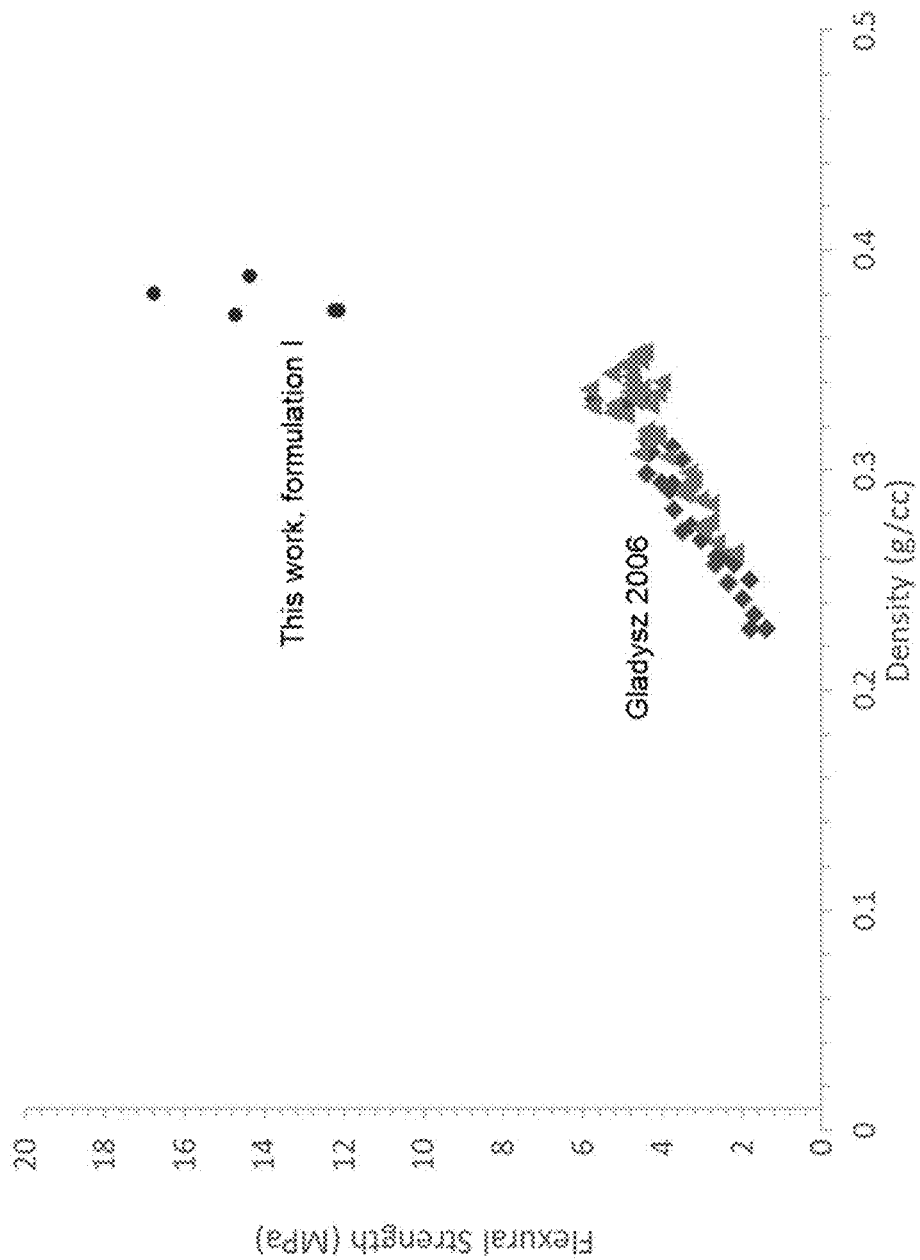
FIG. 19 is a graph showing flexural strength (in megapascals (MPa) as a function of density (grams per cubic centimeter (g/cc) for syntactic foams prepared from an exemplary syntactic foam ink of the presently disclosed subject matter, i.e., Formula I (data in circles). For comparison, data is also provided for previously described syntactic foams from Gladysz et al. (Journal of Materials Science, 41(13):4085-4092 (2006), i.e., Gladysz 2006). The foams from Gladysz 2006 contained carbon microballoons (CMB) at different densities, 0.138 g/cc (data in diamonds) and 0.179 g/cc (data in triangles).
Figure 20:
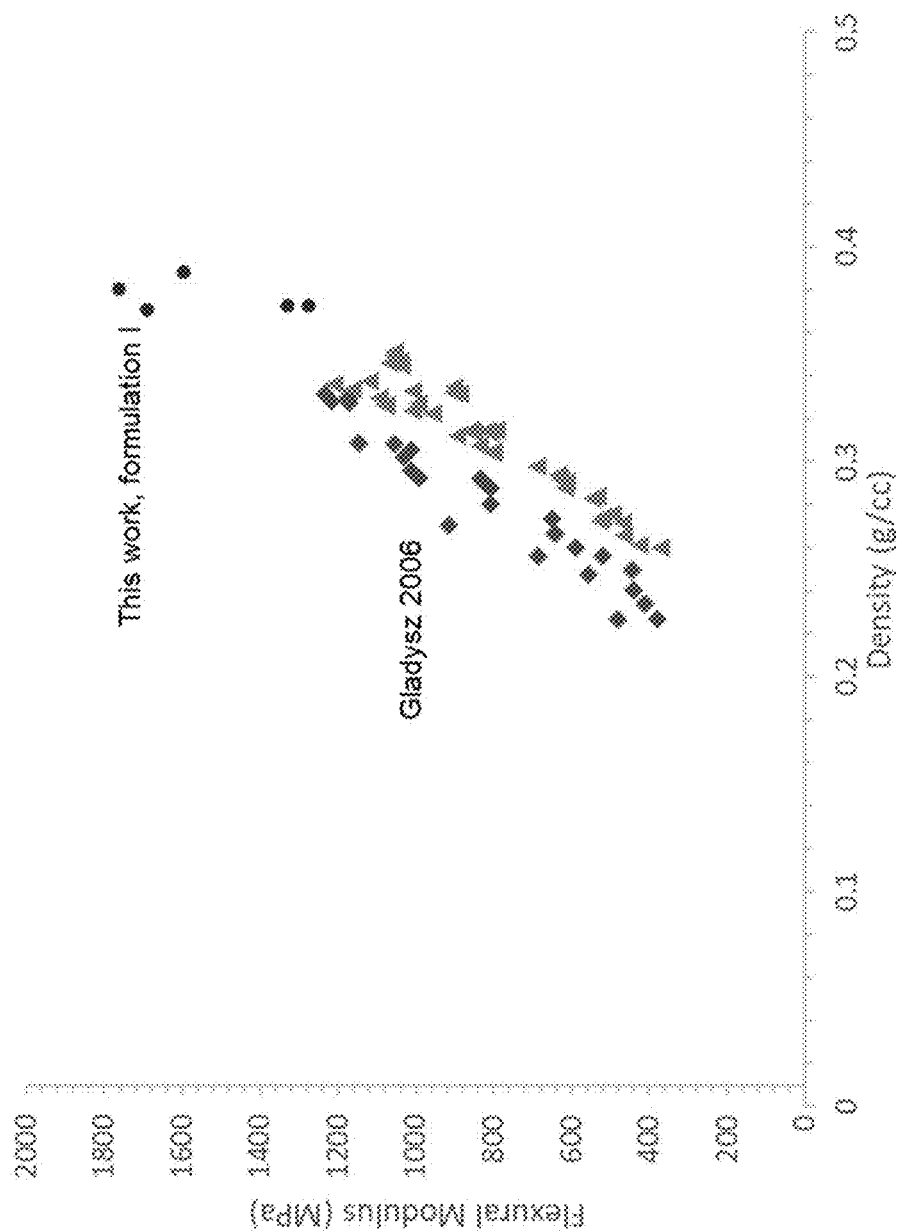
FIG. 20 is a graph showing flexural modulus (in megapascals (MPa) as a function of density (grams per cubic centimeter (g/cc) for syntactic foams prepared from an exemplary syntactic foam ink of the presently disclosed subject matter, i.e., Formula I (data in circles). For comparison, data is also provided for previously described syntactic foams from Gladysz et al. (Journal of Materials Science, 41(13):4085-4092 (2006), i.e., Gladysz 2006). The foams from Gladysz 2006 contained carbon microballoons (CMB) at different densities, 0.138 g/cc (data in diamonds) and 0.179 g/cc (data in triangles).

Following the compression case, FIGS. 19 and 20 demonstrate the overall flexural strength-to-density trend of specimens prepared from the presently disclosed ink plotted against examples from the literature. The present ink provides products having a performance similar to the prior materials.

Structures prepared from the presently disclosed syntactic foam inks were stronger at lower densities than syntactic foam materials previously described in the literature.

Example 8

Microscopy

The microstructure of a fully cured 6 mm honeycomb printed with the syntactic foam ink was analyzed using a Phenom ProX desktop scanning electron microscope (Nanoscience Instruments, Phoenix, Arizona, United States of America). The honeycomb had been smashed with a hammer following curing in order to produce sample surfaces small enough to use within the microscope. Two surfaces were selected for imaging: one demonstrating intralayer morphology along the honeycomb's xy plane, and a second demonstrating interlayer morphology along the honeycomb's z axis. Both sample surfaces were sputter coated with approximately 0.5 nm of pure gold prior to microscopy in order to improve resultant image quality. Images were recorded using a beam energy of 15 kilovolts (kV).

Figures 21A, 21B, 21C:
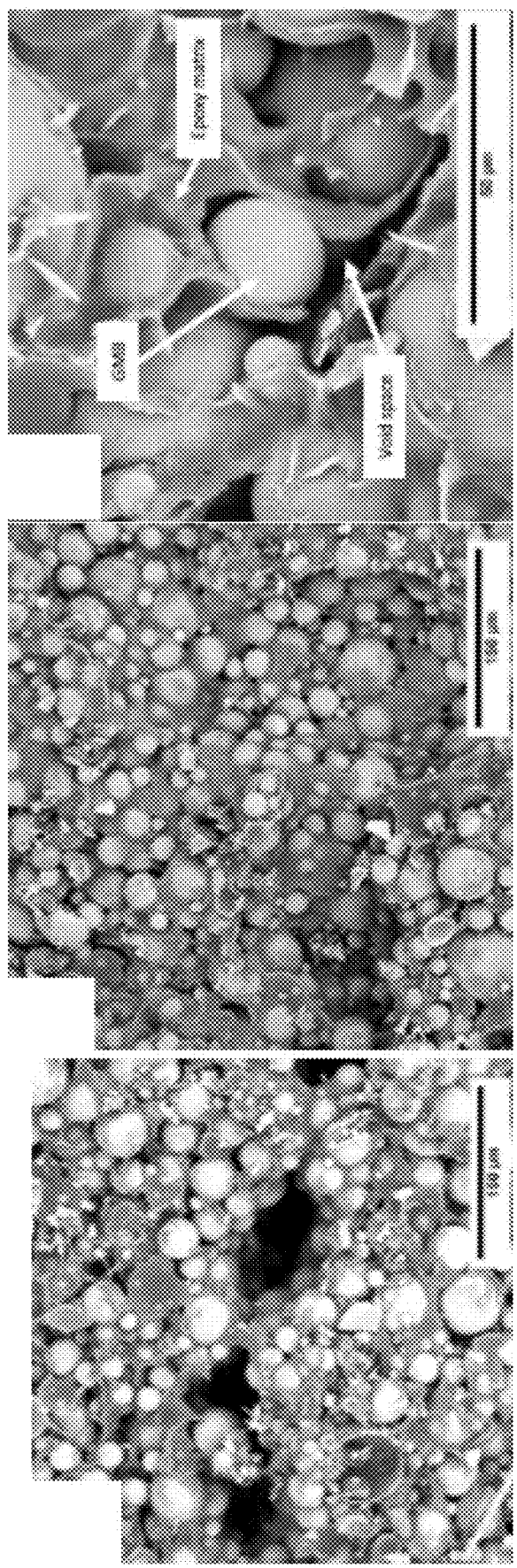
FIG. 21A is a scanning electron micrograph (SEM) image of fracture surfaces of a syntactic foam prepared as described in the presently disclosed subject matter from an exemplary syntactic foam ink comprising an epoxy resin, an amine curing agent, glass microballoons (GMBs), and nanoclay filler, i.e., Formula I. The image shows a view of the interface between two layers, exhibiting larger void spaces (as indicated by the dark areas) from solvent outgassing. The scale bar in the lower right of the image corresponds to 150 micrometers (μm).
FIG. 21B is a scanning electron micrograph (SEM) image of fracture surfaces of a syntactic foam prepared as described in the presently disclosed subject matter from an exemplary syntactic foam ink comprising an epoxy resin, an amine curing agent, glass microballoons (GMBs) and nanoclay filler, i.e., Formula I. The image shows a view of a top face of a single layer which possesses a relatively uniform distribution of all three phases: epoxy matrix, (GMBs), and void space. The scale bar in the lower right of the image corresponds to 150 micrometers (μm).
FIG. 21C is a magnified micrograph image of the material shown in FIG. 21B, further demonstrating the distinction between the foam's three constituent phases: epoxy matrix, glass microballoons (GMBs), and void space. The scale bar in the lower right of the image corresponds to 50 micrometers (μm).

Images recorded for both the intra- and interlayer foam fracture surfaces are shown in FIGS. 21A-21O. Both surfaces demonstrate the foam's three distinct phases of composite matrix, void space and enclosed microsphere.

Example 9

Additional Ink Variation

An additional ink formula variation (Formula VII) was prepared using dicyandiamide (sold under the tradename AMICURE™ CG-1200G, Evonik Operations GMBH, Essen Germany). The components of the variant formulation are listed in Table 13, below. More particularly, ink Formula VII includes the same epoxy resin as Formula III described in Example 5.

TABLE 13

Ink Formula VII.

| Constituent | Batch mass (g) |
|---|---|
| Epoxy resin B (EPON™ 826) | 5 |
| Dicyandiamide (AMICURE™ CG-1200G) | 0.25 |
| Nanoclay | 2 |
| GMBs | 5.5 |
| MEK | 1.5 |
| Acetone | 1.75 |
| Camphor | 7 |

Figure 22:
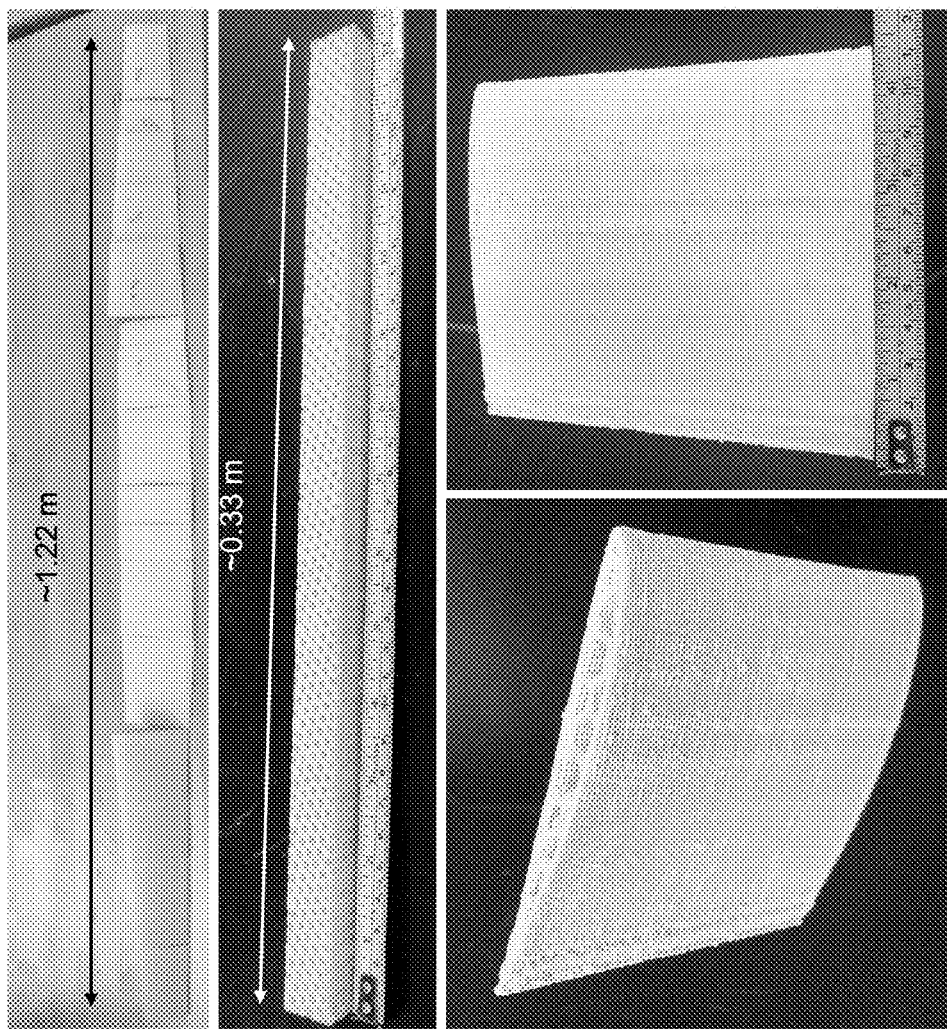
FIG. 22 is a series of photographic images of large-scale three-dimensional printed wing sections printed using an exemplary ink formula of the presently disclosed subject matter including epoxy resin and a dicyandiamide curing agent (Formula VII). The scale bar in the image at the top corresponds to 1.22 meters (m). The scale bar in the image second from the top corresponds to about 0.33 m.

FIG. 22 shows photographic images of some large-scale 3D printed wing sections prepared using Formula VII.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method of preparing a three-dimensional syntactic foam object, the method comprising:
   (a) providing a curable composition comprising a thermosetting resin, a curing agent, a plurality of hollow spheres, a solvent, and a non-hollow filler, wherein the curable composition comprises: (i) about 5 weight percent (wt %) to about 25 wt % of the thermoset resin, (ii) about 0.1 wt % to about 6 wt% of the curing agent, (iii) about 20 wt % to about 40 wt % of the hollow spheres, (iv) about 30 wt % to about 55 wt % of the solvent, and (v) about 0.1 wt % to about 25 wt % of the non-hollow filler;
   (b) depositing a first layer of the curable composition;
   (c) depositing one or more additional layers of the curable composition on the first layer sequentially, thereby forming a three-dimensional curable object; and
   (d) curing the three-dimensional curable object, thereby providing the three-dimensional syntactic foam object.

2. The method of claim 1, wherein the method further comprises pre-curing the three-dimensional curable object prepared in step (c) prior to step (d), wherein the pre-curing comprises heating the three-dimensional curable object to a first temperature for a first period of time, wherein the first temperature is a temperature lower than a temperature used to cure the curable object.

3. The method of claim 2, wherein the first temperature is about 50 degrees Celsius (° C.) to about 100° C. and wherein the first period of time is about 4 hours to about 3 days.

4. The method of claim 1, wherein the method further comprises:
   (e) pyrolyzing the three-dimensional syntactic foam object at a second temperature for a second period of time, wherein the second temperature is about 600° C. to about 1000° C.

5. The method of claim 1, wherein the thermoset resin is an epoxy resin and the curing agent is an amine or a substituted guanidine.

6. The method of claim 5, wherein the curing agent is diaminodiphenylsulfone (DDS) or dicyandiamide.

7. The method of claim 1, wherein the plurality of hollow spheres comprise hollow glass microspheres.

8. The method of claim 1, wherein the solvent comprises one or more of methyl ethyl ketone (MEK), acetone, and camphor.

9. The method of claim 1, wherein the non-hollow filler is one or more of the group consisting of nanoclay, fumed silica, graphene, carbon fibers, and carbon nitride nanoparticles.

10. The method of claim 1, wherein the three-dimensional syntactic foam object has a density of about 0.38 grams per cubic centimeter (g/cc) or less or of about 0.21 g/cc or less.

11. The method of claim 1, wherein the depositing comprises extruding the curable composition from a syringe or other extruder.

12. A three-dimensional syntactic foam object prepared according to the method of claim 1.

13. The three-dimensional syntactic foam object of claim 12, wherein said object has a height of about 2 millimeters or more.

14. The three-dimensional syntactic foam object of claim 12, wherein object has a density of less than about 0.21 grams per cubic centimeter (g/cc) and a compressive strength of at least about 1 megapascal (MPa).

15. A method of preparing a three-dimensional syntactic foam object, the method comprising:
   (a) providing a curable composition comprising a thermosetting resin, a curing agent, a plurality of hollow spheres, a solvent, and a non-hollow filler;
   (b) depositing a first layer of the curable composition;
   (c) depositing one or more additional layers of the curable composition on the first layer sequentially, thereby forming a three-dimensional curable object;
   (d) curing the three-dimensional curable object, thereby providing the three-dimensional syntactic foam object; and
   (e) pyrolyzing the three-dimensional syntactic foam object at a second temperature for a second period of time, wherein the second temperature is about 600° C. to about 1000° C.

* * * * *